US010311395B2

(12) United States Patent
DeBusk et al.

(10) Patent No.: US 10,311,395 B2
(45) Date of Patent: Jun. 4, 2019

(54) INVENTORY DATA MANAGEMENT SYSTEM

(75) Inventors: Brian Clark DeBusk, Knoxville, TN (US); Angela Michelle Sewell, Knoxville, TN (US); John Garner Jacobs, Knoxville, TN (US); Rex Alan Hurd, Knoxville, TN (US); Elizabeth Ann White, Strawberry Plains, TN (US); Jeffrey Dennis Griffith, Knoxville, TN (US); Samuel Joseph Elijah Fox, Oliver Springs, TN (US)

(73) Assignee: DeRoyal Industries, Inc., Powell, TN (US)

( * ) Notice: Subject to any disclaimer, the term of this patent is extended or adjusted under 35 U.S.C. 154(b) by 0 days.

(21) Appl. No.: 13/459,366

(22) Filed: Apr. 30, 2012

(65) Prior Publication Data
US 2012/0316987 A1 Dec. 13, 2012

Related U.S. Application Data

(63) Continuation-in-part of application No. 13/154,880, filed on Jun. 7, 2011, now abandoned.

(51) Int. Cl.
G06Q 10/08 (2012.01)
(52) U.S. Cl.
CPC .................... G06Q 10/08 (2013.01)
(58) Field of Classification Search
CPC combination set(s) only.
See application file for complete search history.

(56) References Cited

U.S. PATENT DOCUMENTS

| 5,912,818 A * | 6/1999 | McGrady | G06M 7/04 700/214 |
| 6,415,978 B1 * | 7/2002 | McAllister | G06K 7/0004 235/462.01 |
| 7,689,316 B1 * | 3/2010 | Frederick et al. | 700/232 |
| 2006/0232382 A1 | 10/2006 | Bauer et al. | |

(Continued)

OTHER PUBLICATIONS

Doc 2.0 User Manual; Deroyal Order Connection User Documentation (49 Pages); May 2009; United States.

Primary Examiner — Paul Danneman
(74) Attorney, Agent, or Firm — Luedeka Neely Group, P.C.; Mark Crockett; Rick Barnes

(57) ABSTRACT

An inventory data management system manages information related to items, such as implants, used during a medical procedure. The inventory data management system includes multiple sensing devices for reading set identification information from a container in which the set of items is disposed. The sensing devices are connected to a communication network and are placed in multiple locations, where each location is associated with a particular status of the set of items. The system also includes an inventory management computer that executes an inventory management application for receiving the set identification information from the communication network, and associating the set identification information with set status information based on the location of the sensing device that read the set identification information. An item inventory database stores the set identification information in association with the set status information.

7 Claims, 42 Drawing Sheets

(56) References Cited

U.S. PATENT DOCUMENTS

| | | | |
|---|---|---|---|
| 2008/0030345 A1* | 2/2008 | Austin | A61B 90/90 340/572.8 |
| 2008/0077433 A1 | 3/2008 | Kasprisin et al. | |
| 2008/0215363 A1 | 9/2008 | Kasprisin et al. | |
| 2008/0272886 A1* | 11/2008 | Tiller | G06K 19/08 340/10.1 |
| 2009/0037244 A1 | 2/2009 | Pemberton | |
| 2009/0267769 A1* | 10/2009 | Stevens | G06Q 10/087 340/572.1 |
| 2010/0134257 A1 | 6/2010 | Puleston et al. | |
| 2010/0141457 A1 | 6/2010 | Wass et al. | |
| 2010/0161345 A1 | 6/2010 | Cain et al. | |
| 2010/0274591 A1 | 10/2010 | Wells | |
| 2013/0035950 A1 | 2/2013 | MacDonald et al. | |

* cited by examiner

| DeRoyal Trauma | Customer Service: 1-800-251-9864 200 Debusk Lane  Powell, TN 37849 | Small Locking/Compression Plating System |

Inventory Control Form

Patient Information:

Date:

Hospital:

Surgeon:

Procedure:

COMPRESSION PLATES

3.5mm Straight

| Qty | Item | Bar Code | Holes | Length |
|---|---|---|---|---|
|  | 73525.5 |  | 2 | 25mm |
|  | 73538.5 |  | 3 | 38mm |
|  | 73551.5 |  | 4 | 51mm |
|  | 73564.5 |  | 5 | 64mm |
|  | 73577.5 |  | 6 | 77mm |
|  | 73590.5 |  | 7 | 90mm |
|  | 735103.5 |  | 8 | 103mm |
|  | 735116.5 |  | 9 | 116mm |
|  | 735129.5 |  | 10 | 129mm |
|  | 735142.5 |  | 11 | 142mm |
|  | 735155.5 |  | 12 | 155mm |
|  | 735181.5 |  | 14 | 181mm |
|  | 735195.5 |  | 15 | 195mm |
|  | 735207.5 |  | 16 | 207mm |
|  | 735233.5 |  | 18 | 233mm |
|  | 735259.5 |  | 20 | 259mm |

3.5mm Reconstruction

| Qty | Item | Bar Code | Holes | Length |
|---|---|---|---|---|
|  | 73558 |  | 5 | 58mm |
|  | 73570 |  | 6 | 70mm |
|  | 73582 |  | 7 | 82mm |
|  | 73594 |  | 8 | 94mm |
|  | 735106 |  | 9 | 106mm |
|  | 735118 |  | 10 | 118mm |

3.5mm 1/3 Tubular with Collar

| Qty | Item | Bar Code | Holes | Length |
|---|---|---|---|---|
|  | 73525 |  | 2 | 25mm |
|  | 73537 |  | 3 | 37mm |
|  | 73549 |  | 4 | 49mm |
|  | 73561 |  | 5 | 61mm |
|  | 73573 |  | 6 | 73mm |
|  | 73585 |  | 7 | 85mm |
|  | 73597 |  | 8 | 97mm |
|  | 73519 |  | 9 | 105mm |
|  | 735121 |  | 10 | 121mm |
|  | 735145 |  | 12 | 145mm |

3.5mm T-Plates, Right Angle

| Qty | Item | Bar Code | Head Holes | Shaft Holes | Length |
|---|---|---|---|---|---|
|  | 73550 |  | 3 | 3 | 50mm |
|  | 73556 |  | 4 | 4 | 56mm |
|  | 73567 |  | 3 | 5 | 67mm |

3.5mm T-Plates, Right Angle

| Qty | Item | Bar Code | Head Holes | Shaft Holes | Length |
|---|---|---|---|---|---|
|  | 73553.3 |  | 3 | 3 | 53mm |
|  | 73563.3 |  | 3 | 4 | 63mm |
|  | 73575.3 |  | 3 | 5 | 75mm |

FIG. 20

DeRoyal.com Home Customer Applications DeRoyal Order Connection

DeRoyal Order Connection

Customer: Trauma Customer
Location: Trauma Location 1

Product Catalog | Billing Index | Help | Logout

Usage | Ordering | Receiving | Maintenance | Reports

Log Usage | Print Picking Ticket | Transfer Inventory | Inventory Control Form

Usage
All Rooms
Enter Usage
Case List

○ Not Logged   ○ All Cases    — 110

| Case | Room | Start Time | Surgeon | Patient | Status |
|------|------|------------|---------|---------|--------|
| 267 | Operating Room 1 | 7/7/2009 8:00 AM | Dr. Jones | Robby Knievel | NEW |
| 295 | Operating Room 2 | 7/7/2009 8:00 AM | Dr. Smith | Joe Theismann | NEW |

— 112

Case Detail

| Case | 267 |
|------|-----|
| Room | Operating Room 1 |
| Start Time | 7/7/2009 8:00:00 AM |
| Procedure | CPT68 |
| Surgeon | Dr. Jones |
| Patient | Robby Knievel |
| Medical Record | RK93713-326 |

Technical Assistance | Order Assistance | Legal Notices & Disclaimers

DeRoyal.com Home  Customer Applications  DeRoyal Order Connection

DeRoyal Order Connection

Customer: Trauma Customer
Location: [Trauma Location 1▼]

[☐Usage][☐Ordering][☐Receiving][✗Maintenance][🔍Reports]
Log Usage | Print Picking Ticket | Transfer Inventory | Inventory Control Form Product Catalog | Billing Index | Help | Logout Picking Ticket
Set: [Tray ▼] — 152

— 150

— 154

| Item | Description | Quantity Needed | Quantity Picked | Quantity Available (Default Location) |
|---|---|---|---|---|
| 14010.1 | Cncls Screw, 4.0mm x 10mm Fully Threaded, SS | 1 EA | | 10 EA |
| 14014.2 | Cncls Screw, 4.0mm x 14mm Partially Threaded, SS | 1 EA | | 0 EA*** |
| 14016.1 | Cncls Screw, 4.0mm x 16mm Fully Threaded, SS | 1 EA | | 0 EA*** |
| 14018.2 | Cncls Screw, 4.0mm x 18mm Partially Threaded, SS | 3 EA | | 0 EA*** |

*** Denotes insufficient inventory to restock set.

Technical Assistance | Order Assistance | Legal Notices & Disclaimers

DeRoyal.com Home  DeRoyal Order Connection

DeRoyal Order Connection

Customer: Test Customer
Location: Location Two ▼
$ Billing Index  🔒 Logout

ⓘUsage ▢Ordering 🛒Receiving ✗Maintenance 🔍Reports
Inventory ⓘ Inventory Locations | Items | Suppliers | Account Info Inventory Supplier: DEROYAL ▼  — 262
Inventory Location: ERCLOSET ▼  — 264
                                      — 266

Inventory (Select Item No. for Inventory Transactions)     — 268

| Item | Supplier | Description | Quantity On Hand |
|---|---|---|---|
| 2S-001 | DEROYAL | Instrument Pad, magnetic Size: 10" x 16" | 92 EA |
| 350SL | DEROYAL | Wrist & Thumb Splint 8", Tritex, LT, S | 3 EA |
| AB2340-00 | DEROYAL | Ankle Brace, Confor Elasticized Straps, Standard | 5 EA |
| SL2001-10 | DEROYAL | Walker, Low Profile Open Surface, S | 0 EA |
| SL2001-12 | DEROYAL | Walker, Low Profile Open Surface, M | 5 EA |
| SL2001-14 | DEROYAL | Walker, Low Profile Open Surface, L | 5 EA |

Technical Assistance | Order Assistance | Legal Notices & Disclaimers

FIG. 28

DeRoyal.com Home   DeRoyal Order Connection

DeRoyal Order Connection

Customer: Test Customer
Location: Location Two

[$] Usage [ ] Ordering [ ] Receiving [X] Maintenance [ ] Reports                    [$] Billing Index  [?] Logout
Inventory | Inventory Locations | Items | Suppliers | Account Info Inventory
Item: 350SL   Inventory Location: [All Locations ▼]   Quantity: 3EA    ● Show 90 Days   ○ Show All
◇ Return to Inventory Overview Inventory Transactions

| Date | Inventory Loc | Reason | Type | Qty |
|---|---|---|---|---|
| 9/3/2008 2:54:10 PM | ERCLOSET | smithjohn | USAGE | -2 EA |
| 9/3/2008 2:53:47 PM | ERCLOSET | | ADJUST | 5 EA |
| 9/3/2008 2:42:49 PM | ERCLOSET | 123 | USAGE | -1 EA |
| 9/3/2008 2:39:16 PM | ERCLOSET | 123 | USAGE | -1 EA |
| 9/3/2008 1:15:33 PM | ERCLOSET | test2 | USAGE | -2 EA |
| 9/3/2008 1:08:55 PM | ERCLOSET | SMITHJOHN | USAGE | -2 EA |
| 9/3/2008 1:08:32 PM | ERCLOSET | | ADJUST | 5 EA |
| 9/3/2008 1:05:54 PM | ERCLOSET | SMITHJOHN | USAGE | -2 EA |
| 8/28/2008 4:39:44 PM | ERCLOSET | SMITHJOHN | USAGE | -2 EA |
| 8/28/2008 4:38:53 PM | ERCLOSET | | ADJUST | 5 EA |

Inventory Transaction Details        [⊗ Adjust]

| * REQUIRED | |
|---|---|
| Item | 350SL |
| Date | 9/3/2008 2:54:10 PM |
| Inventory Loc | ERCLOSET |
| Reason | smithjohn |
| Type | USAGE |
| * Adjustment Qty | 2 |

Technical Assistance | Order Assistance | Legal Notices & Disclaimers

FIG. 29

DeRoyal.com Home  DeRoyal Order Connection

DeRoyal Order Connection

Customer: Test Customer
Location: [Location Two ▾]
⊕ Billing Index  ⊇ Logout

[▢ Usage] [☐ Ordering] [▣ Receiving] [✕ Maintenance] [⊙ Reports]
Inventory ( Inventory Locations ) Items | Suppliers | Account Info Inventory Locations

Inventory Locations List — 308

| Location Key | Location Description | Primary Loc |
|---|---|---|
| ERCLOSET | Emergency Room Closet | True |
| ICU Closet | Closet in ICU Department | False |

— 310

Inventory Location Details — 312

| | ⊘ Edit  ⊕ Add  🗑 Delete |
|---|---|
| * REQUIRED | |
| * Location Key | ERCLOSET |
| * Location Description | Emergency Room Closet |
| * Primary Location | |

Technical Assistance | Order Assistance | Legal Notices & Disclaimers

FIG. 30

DeRoyal.com Home  DeRoyal Order Connection

DeRoyal Order Connection

Customer: Trauma Customer
Location: All Locations

[ ] Usage [ ] Ordering [ ] Receiving [ ] Maintenance [ ] Reports

Inventory | Inventory Locations | Items | Suppliers | Account Info

Product Catalog | Billing Index | Help | Logout

Items
Supplier: (All Suppliers ▼) — 368

— 366
— 370
— 372

Item List

| Item | Supplier | Description |
|---|---|---|
| 25-001 | DEROYAL | Instrument Pad, Magnetic Size: 10" x 16" |
| 350SL | DEROYAL | Wrist & Thumb Splint 8", Tritex, LT, S |
| AB2340-00 | DEROYAL | Ankle Brace, Confor Elasticised Straps, Standard |
| SL2001-10 | DEROYAL | Walker, Low Profile Open Surface, S |
| SL2001-12 | DEROYAL | Walker, Low Profile Open Surface, M |
| SL2001-14 | DEROYAL | Walker, Low Profile Open Surface, L |
| 123 | SUPPLIER1 | Needle Counter |

Item Details

| | (Edit) (Add) (Delete) |
|---|---|
| * REQUIRED | |
| * Item | 25-001 |
| * Supplier | DEROYAL |
| * Description 1 | Instrument Pad, Magnetic |
| * Description 2 | Size: 10" x 16" |
| * Price | 0 |
| * Purchase UOM | CA |
| * Usage UOM | EA |
| * UOM Conversion | 30 |

Technical Assistance | Order Assistance | Legal Notices & Disclaimers

FIG. 31

DeRoyal.com Home Customer Applications DeRoyal Order Connection ◇System Upgraded August 31 >>MORE DeRoyal Order Connection Customer: Test Customer
Location: Location Two ▽

☐Usage ☐Ordering ☐Receiving ☒Maintenance ☐Reports

Product Catalog | Billing Index | Help | Logout

Inventory | Inventory Locations | Items | Cycle Count | Suppliers | Account Info Cycle Counts
◇ Return to List    🖶 Print Name: Test Cycle Count    Location: CLOSETA

— 418

| Item | Supplier | Description | UOM | Count Qty |
|---|---|---|---|---|
| 9006-00 | DeRoyal Industries, Inc. | Sling & Swathe Blue Foam, Adjstble Straps, Univ | EA | |
| SL1201-10 | DeRoyal Industries, Inc. | Walker, Articulating Adjustable Hinge, S | EA | |
| SL2001-10 | DeRoyal Industries, Inc. | Walker, Low Profile Open Surface, S | EA | |
| SL2001-12 | DeRoyal Industries, Inc. | Walker, Low Profile Open Surface, M | EA | |
| SL2001-14 | DeRoyal Industries, Inc. | Walker, Low Profile Open Surface, L | EA | |

Technical Assistance | Order Assistance | Legal Notices & Disclaimers

DeRoyal.com Home  Customer Applications  DeRoyal Order Connection

DeRoyal Order Connection

◇ System Upgraded August 31  >> MORE

Customer: Test Customer
Location: Location Two ▼

[ ] Usage [ ] Ordering [ ] Receiving [X] Maintenance [ ] Reports

Product Catalog | Billing Index | Help | Logout

Inventory | Inventory Locations | Items | Cycle Count | Suppliers | Account Info Cycle Counts
◇ Return to List   [ ] Print   [✓] Show Only Items With Variance Name: Test Cycle Count   Location: CLOSETA

| Item | Supplier | Description | UOM | Count Qty | Qty On Hand | Variance | Variance $ |
|---|---|---|---|---|---|---|---|
| AB2320-00 | DeRoyal Industries, Inc. | Ankle Stirrup, Flex N Fit White, Standard, Univ | EA | 2 | 0 | 2 | $0.00 |
| SL1201-10 | DeRoyal Industries, Inc. | Walker, Articulating Adjustable Hinge, S | EA | 12 | 3 | 9 | $0.00 |
| SL2001-10 | DeRoyal Industries, Inc. | Walker, Low Profile Open Surface, S | EA | 2 | 4 | -2 | $0.00 |
| SL2001-12 | DeRoyal Industries, Inc. | Walker, Low Profile Open Surface, M | EA | 13 | 1 | 12 | $0.00 |
| SL2001-14 | DeRoyal Industries, Inc. | Walker, Low Profile Open Surface, L | EA | 0 | 2 | -2 | $0.00 |
| | | | | | Variance Total: | 19 | $0.00 |

492

Technical Assistance | Order Assistance | Legal Notices & Disclaimers

FIG. 38

DeRoyal.com Home  DeRoyal Order Connection

DeRoyal Order Connection

Customer: Test Customer
Location: All Locations
💲Billing Index  🔒Logout

[📋Usage][📋Ordering][📋Receiving][✂Maintenance][🔄Reports]
Inventory | Inventory Locations | Items | Suppliers  (Account Info)  — 628

Account Info

Ship-To Locations — 630

| Location Key | Location Name |
|---|---|
| 3 | Location Three |
| 2 | Location Two |

Order Confirmation Email                    ✏Edit — 632

| * REQUIRED | |
|---|---|
| * Location | 3 |
| * Location Name | Location Three |
| Email Address | (No Email Address Entered) |

Technical Assistance | Order Assistance | Legal Notices & Disclaimers

FIG. 40

Consignment Report

Filter consignment Inventory By Location: All Locations ▼

|◀ ◀ 1 of 12 ▶ ▶| 100% ▼ [   ] Find | Next Select a format ▼ Export

DeRoyal Order Connection - Consignment Inventory

211247 - WEST END ORTHO CLINIC - C
LOCATION: 211249 - WEST END ORTHO CLINIC
1400 JOHNSTON WILLIS DRIVE
RICHMOND, VA

| Part # | Description | Qty |
|---|---|---|
| 1120917 | Knee Immobilizer, Tri-Panel 12IN, Canvas | 1 EA |
| 1140917 | Knee Immobilizer, Tri-Panel 14IN, Canvas | 1 EA |
| 1190917 | Knee Immobilizer, Tri-Panel 19IN, Canvas | 4 EA |
| 13850007 | Lumbar Sacral Support Criss-Cross, 36-40IN, L | 1 EA |
| 13850008 | Lumbar Sacral Support Criss-Cross, 40-44IN, XL | 1 EA |
| 13850056 | Lumbar Sacral Support Criss-Cross, 28-32IN, S/M | 1 EA |
| 13850067 | Lumbar Sacral Support Criss-Cross, 32-36IN, M/L | 1 EA |
| 2035-01 | Cast Shoe Navy Canvas, Rocker, Open, Child | 2 EA |

Contact The DeRoyal Web Group to report functional problem with DeRoyal.com

FIG. 41

INVENTORY DATA MANAGEMENT SYSTEM

RELATED APPLICATIONS

This application claims priority as a continuation-in-part of U.S. patent application Ser. No. 13/154,880 filed Jun. 7, 2011, titled "Implant Inventory Management System."

FIELD

This invention relates to an inventory management system. More particularly, this invention relates to a system for managing inventories of items packaged in kits for use in surgical procedures involving implants.

BACKGROUND

Items to be consumed during medical surgical procedures are often provided in kits that are customized for the particular surgical procedure to be performed. For an implant procedure, these kits include various sizes of the implant, screws for securing the implant, and tools to be used during the procedure. After completion of the procedure, the kits must be replenished to replace items that were consumed. In the past, the replenishment was usually performed by a sales representative of the company that manufactured the kit. For example, the sales representative had a locker in a supply room in the hospital where the representative kept an inventory of items to be used to replace the consumed items. In most circumstances, the sales representative had to manually keep records of items consumed and the quantities of items to be ordered to replace inventory extracted from the locker.

Unfortunately, the inventory replenishment procedure described above was fraught with recording errors and outright fraud, particularly in situations where the sales representative collected a commission based on the number of items consumed during a surgical procedure.

What is needed, therefore, is a system for recording usage of consumable surgical items, ordering replacement items, receiving the items into inventory, and maintaining accurate records of consumed, ordered, and received items.

SUMMARY

The above and other needs are met by an inventory data management system for managing information related to items, such as implants, used during a medical procedure. In one embodiment, the inventory data management system includes multiple sensing devices for reading set identification information from a container in which the set of items is disposed. The sensing devices are connected to a communication network and are placed in multiple locations, where each location is associated with a particular status of the set of items. The system also includes an inventory management computer that executes an inventory management application for receiving the set identification information from the communication network, and associating the set identification information with set status information based on the location of the sensing device that read the set identification information. An item inventory database stores the set identification information in association with the set status information.

In some embodiments, the sensing devices may be disposed in an inventory storage location, an operating room location, a decontamination location, a restocking location, a sterilization location, a manufacturer location, and a Physician Owned Distributorship (POD) location. Based on the sensing device from which the set identification information originated, the inventory management computer associates the set identification information with set status information indicating that the set of items is in inventory storage, in the operating room, in decontamination, in the restocking location, in sterilization, at the manufacturer, or at the POD.

In another aspect, the invention provide a computer-implemented methods for ordering medical items for use during a medical procedure at a customer medical facility. In one embodiment, the method includes:
(a) displaying information on a display device to prompt a user at the customer medical facility to choose either a construct-based pricing option or a line-item pricing option for the medical items;
(b) receiving input from the user to select the construct-based pricing option or the line-item pricing option;
(c) generating a list of medical items from which the user may choose to order, where the list includes pricing information for the medical items determined based on the selection made in step (b); and
(d) displaying the list of medical items on a display device for viewing by the user.

In another embodiment, an ordering method includes:
(a) displaying information on a display device to prompt a user at the customer medical facility to choose to order the medical items from a Physician Owned Distributorship (POD) or to order directly from a manufacturer of the medical items;
(b) receiving input from the user to select to order from the POD or from the manufacturer;
(c) generating a list of medical items from which the user may choose to order, where the list includes pricing information for the medical items that is determined based on the selection made in step (b); and
(d) displaying the list of medical items on a display device for viewing by the user.

BRIEF DESCRIPTION OF THE DRAWINGS

Further advantages of the invention are apparent by reference to the detailed description in conjunction with the figures, wherein elements are not to scale so as to more clearly show the details, wherein like reference numbers indicate like elements throughout the several views, and wherein:

FIG. 20 depicts an inventory control form used during operation of embodiments of an implant inventory management system;

FIGS. 21-41 depict interface display screens as viewable by a user during operation of embodiments an implant inventory management system.

DETAILED DESCRIPTION

Figure 1:
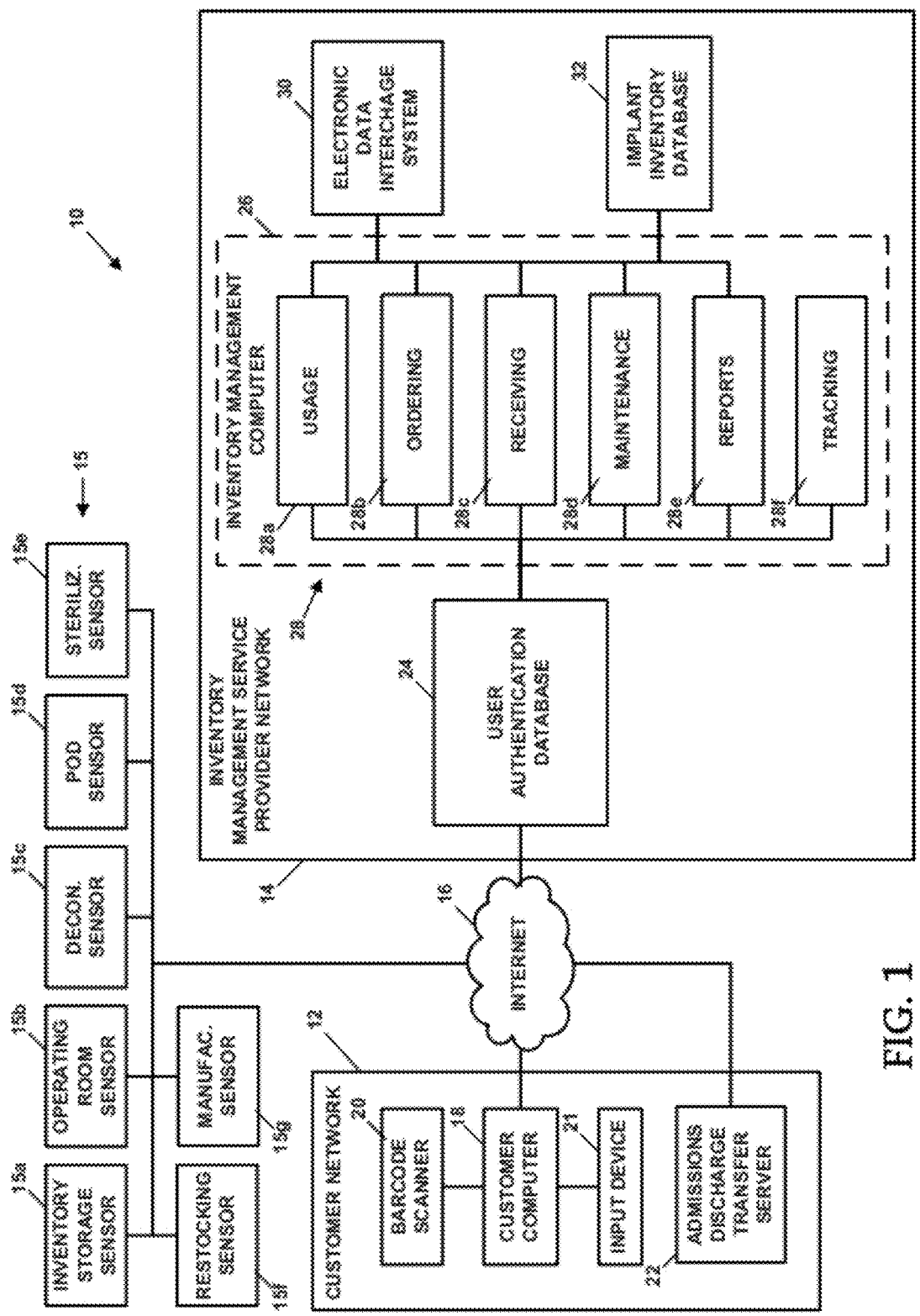
FIG. 1 is a functional block diagram of an embodiment of an implant inventory management system.

FIG. 1 depicts an embodiment of an implant inventory management system 10. As the term is used herein, an "implant" is a medical device or piece of material, such as a plate or screw, which may be used in a medical surgical procedure to repair or replace part of the body. As described in more detail hereinafter, the implant inventory management system 10 provides computer-implemented tools and processes for managing an inventory of medical implants and medical devices used in medical procedures. However, one skilled in the art will recognize that the implant inventory management system 10 may be used to manage inventories of other components and materials in medical and nonmedical applications. Thus, the inventions described herein are not limited to implant inventory applications or medical component inventory applications.

As shown in FIG. 1, the implant inventory management system 10 includes a customer computer network 12 and an inventory management service provider computer network 14 which communicate with each other via a communication network such as the Internet 16. As the term is used herein, "customer" generally refers to a medical facility where surgeries or other medical procedures are performed, such as a hospital or outpatient surgical center, which would consume medical implants during the surgeries or other procedures. The term "customer" may also refer to a Physician Owned Distributorship (POD) that acts as a middleman between medical-device manufacturers and the hospitals or outpatient surgical centers. The term "customer" may also refer to any consumer of goods that are inventoried using the inventory management system described herein. Accordingly, one or more of the components of the customer computer network 12 may be located within a hospital or other medical facility.

The customer computer network 12 includes one or more customer computers 18 that are operable to communicate through the Internet 16 with the inventory management service provider computer network 14. The customer computer 18 may be, for example, a desktop computer, laptop computer, tablet computer, or smart phone. A scanning device 20, such as a barcode scanner or RFID reader, is connected to the customer computer 18, and the customer computer 18 includes software needed to interface and operate with the scanning device 20. A user input device 21, such as a keyboard or mouse or both, is also connected to the customer computer 18.

The customer computer network 12 also includes an admissions-discharge-transfer (ADT) server 22. The ADT server 22 comprises one or more computers that store and manage records regarding the status of patients receiving treatment in a medical facility. Generally, a patient's status is either admitted to the facility, discharged from the facility, or transferred to another facility.

With continued reference to FIG. 1, the inventory management service provider computer network 14 comprises one or more computers which store information and execute software for managing inventories of materials and devices, such as medical implants, tools, and other materials used by the customer in performing medical procedures. As the term is used herein, an "inventory management service provider" may be a company that maintains inventories of implants and other medical devices that are supplied to the customer for use during the performance of medical procedures. An example of one such service provider is DeRoyal Industries, Inc. of Powell, Tenn. Alternatively, the "inventory management service provider" may not maintain the inventory, but may provide inventory management services to another company that does maintain the inventory.

In the embodiment of FIG. 1, the inventory management service provider computer network 14 includes a user authentication database 24, an inventory management computer 26 running an inventory management application 28, an electronic data interchange server 30, and an implant inventory database 32. The user authentication database 24 stores records for each customer/user of the inventory management service provider, such as user ID's, passwords, and billing information. The electronic data interchange server 30, which may be a J.D. Edwards/Oracle server, executes programs for implementing electronic commerce transactions between the inventory management service provider network 14 and the customer network 12. The implant inventory database 32 stores records indicating quantities of each type of implant in inventory.

The inventory management application 28 running on the inventory management computer 26 includes a Usage Module 28a, an Ordering Module 28b, a Receiving Module 28c, a Maintenance Module 28d, a Reports Module 28e, and a Tracking Module 28f. The functionality of each of these modules is described in more detail hereinafter.

As shown in FIG. 1, preferred embodiments of the system 10 include sensors 15 provided at various locations where sets of medical items, such as surgical implants, may be manufactured, stored in inventory, used, restocked, and decontaminated. The sensors 15 are used to read or sense an identification code on each container of the set that uniquely identifies each set. The sensors 15 may be barcode readers, Quick Response (QR) code readers, RFID tag readers, or digital cameras. The sensors 15 may include:
- an inventory storage sensor 15a disposed in an inventory storage location, such as a supply room in a hospital or surgical center;
- an operating room sensor 15b disposed in an operating room of a hospital or surgical center;
- an decontamination sensor 15c disposed in a decontamination area of a hospital or surgical center;
- an POD sensor 15d disposed at a Physician Owned Distributorship (POD);
- a sterilization sensor 15e disposed in a sterilization area of a hospital or surgical center;
- a restocking room sensor 15f disposed in a restocking area of a hospital or surgical center; and
- a manufacturer sensor 15g disposed at the manufacturing facility where the set of medical items is initially built or rebuilt.

In some embodiments, one or more of the sensors 15, such as the inventory storage sensor 15a, operating room sensor 15b, decontamination sensor 15c, and restocking sensor 15f, may be components of the customer network 12 and located within a customer medical facility.

Figure 2:
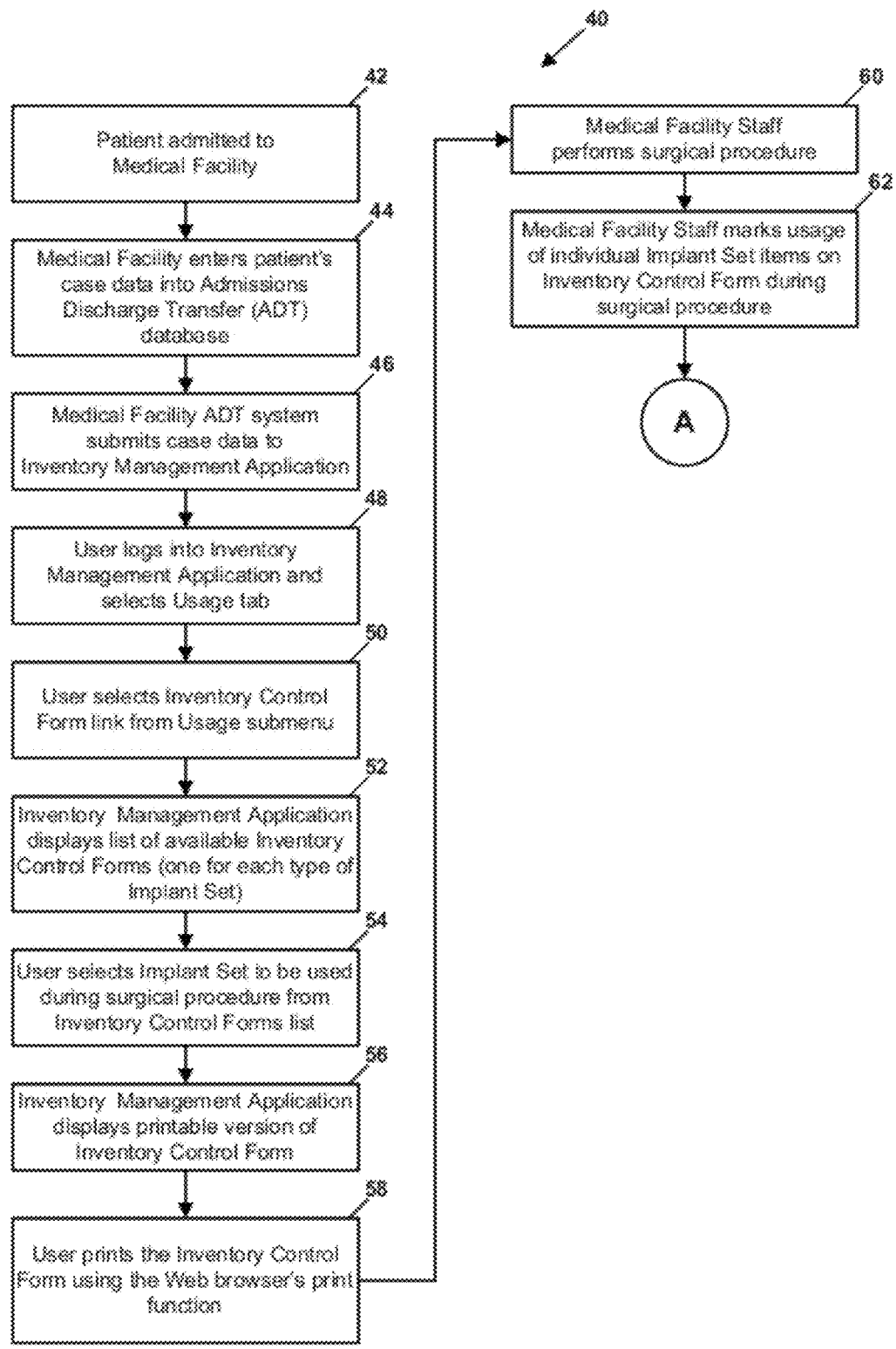
FIGS. 2-17 depict flowcharts describing the operation of embodiments of an implant inventory management system.
Figure 18:
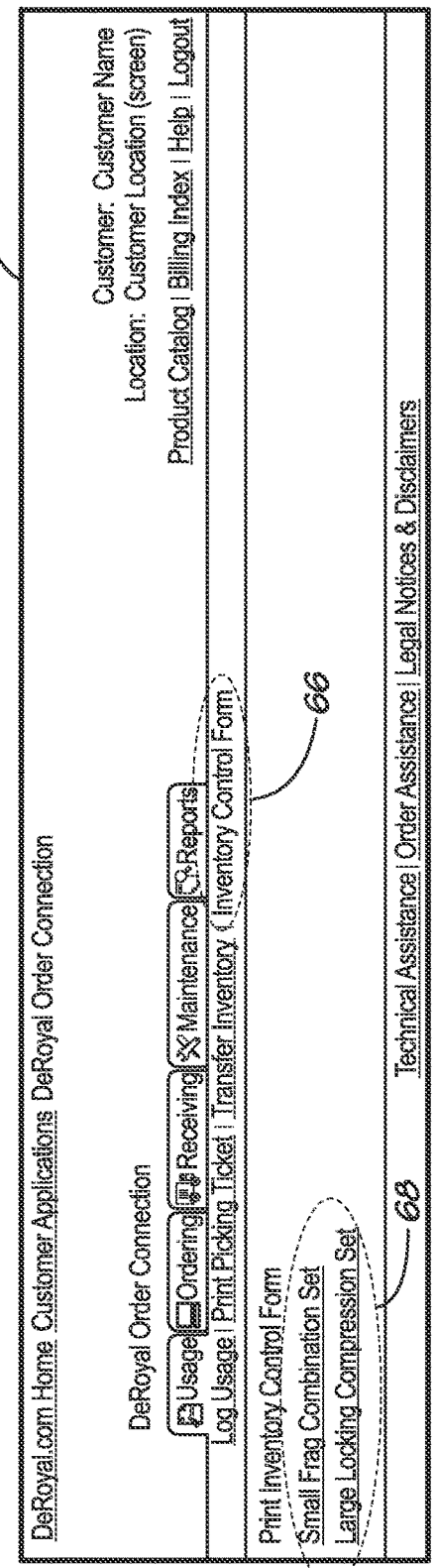
FIGS. 18 and 19 depict interface display screens as viewable by a user during operation of embodiments an implant inventory management system.
Figure 19:
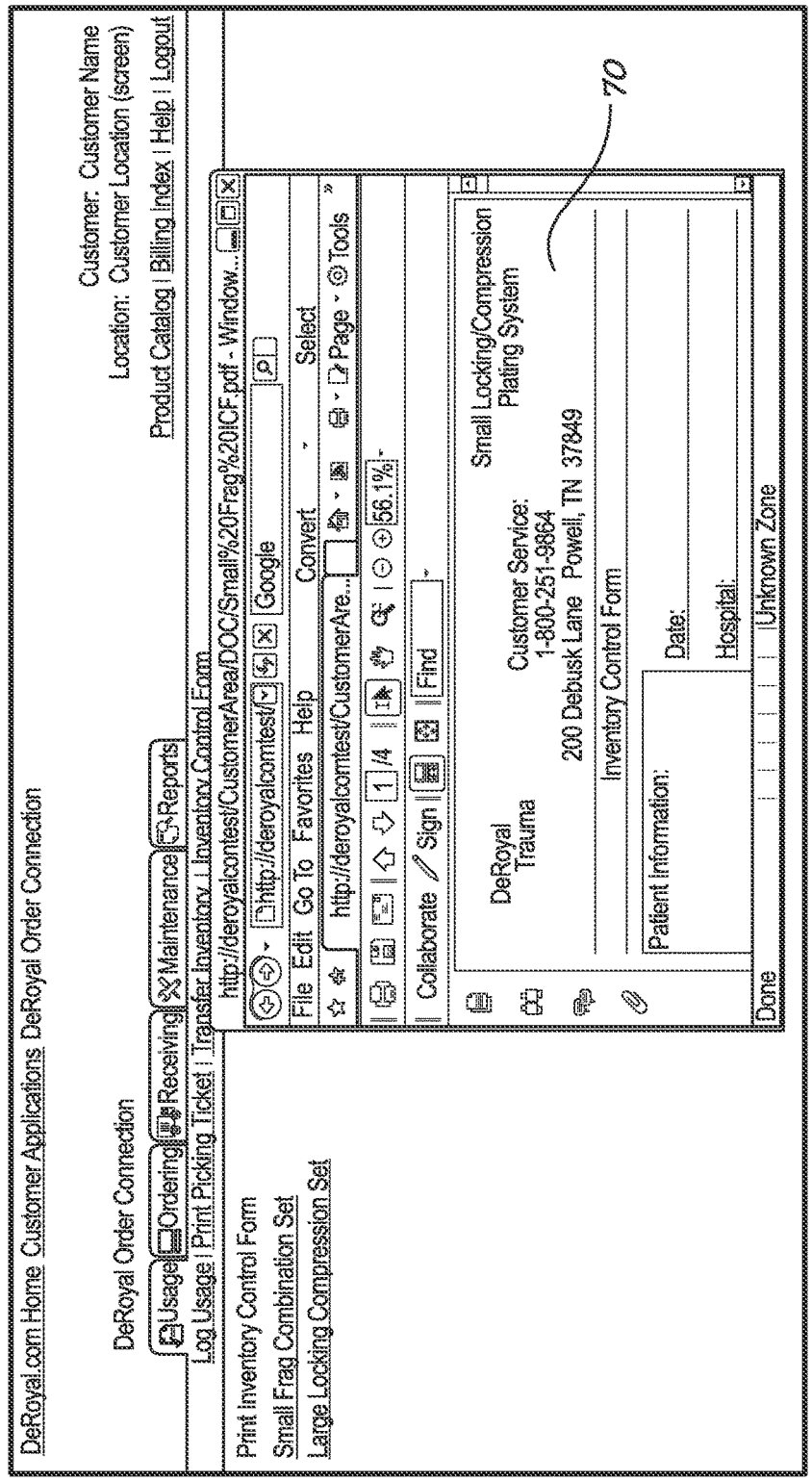

FIG. 2 depicts a process 40 for logging implant usage during a surgical procedure using an Inventory Control Form generated by the Usage Module 28a. When a surgical patient is admitted to the medical facility (step 42), medical facility personnel enter the patient's case data into the ADT server 22 (step 44). The case data is also submitted to the inventory management application 28 running on the inventory management computer 26 (step 46). Using a browser application running on the customer computer 18, a user logs into the inventory management application 28 running on the inventory management computer 26 via the Internet 16 and selects the Usage tab on the browser screen 64 as depicted in FIG. 18 (step 48). This initiates execution of the Usage Module 28a. On the Usage screen, the user selects the Inventory Control Form link 66 (step 50) which causes a list 68 of available Inventory Control Forms to be displayed (step 52). Preferably, one Inventory Control Form is displayed for each type of available implant set. In the example of FIG. 18, two implant sets are available: "Small Frag Combination Set" and "Large Locking Compression Set." When the user selects the implant set to be used in the surgical procedure from the list 68 (step 54), a printable version of the associated Inventory Control Form 70 is displayed (step 56) as shown in FIG. 19. The user then can print a copy of the Inventory Control Form 70, an example of which is shown in FIG. 20, to use during the surgical procedure (step 58). Preferably, during performance of the surgical procedure (step 60), a member of the staff logs the usage of individual implant set items on the form 70 (step 62). Alternatively, the staff member logs the usage on the form 70 after completion of the procedure.

In an alternative embodiment, instead of generating a printout of an Inventory Control Form, an electronic version of the selected Inventory Control Form is downloaded to or otherwise displayed on a pad/tablet computer or smart phone, and the user logs the usage of individual implant set items on the electronic form during or after the procedure.

As the term is used herein, a "set" refers to a collection of sterile medical items that are packaged together to be used during a particular medical procedure. In some embodiments, the set of items are packaged in a tray, wherein there is a designated location in the tray for each item in the set. However, it will be appreciated that the set of items may be packaged in containers other than trays. As the terms are used herein, "set" and "tray" both refer to a collection of medical items.

Figure 3:
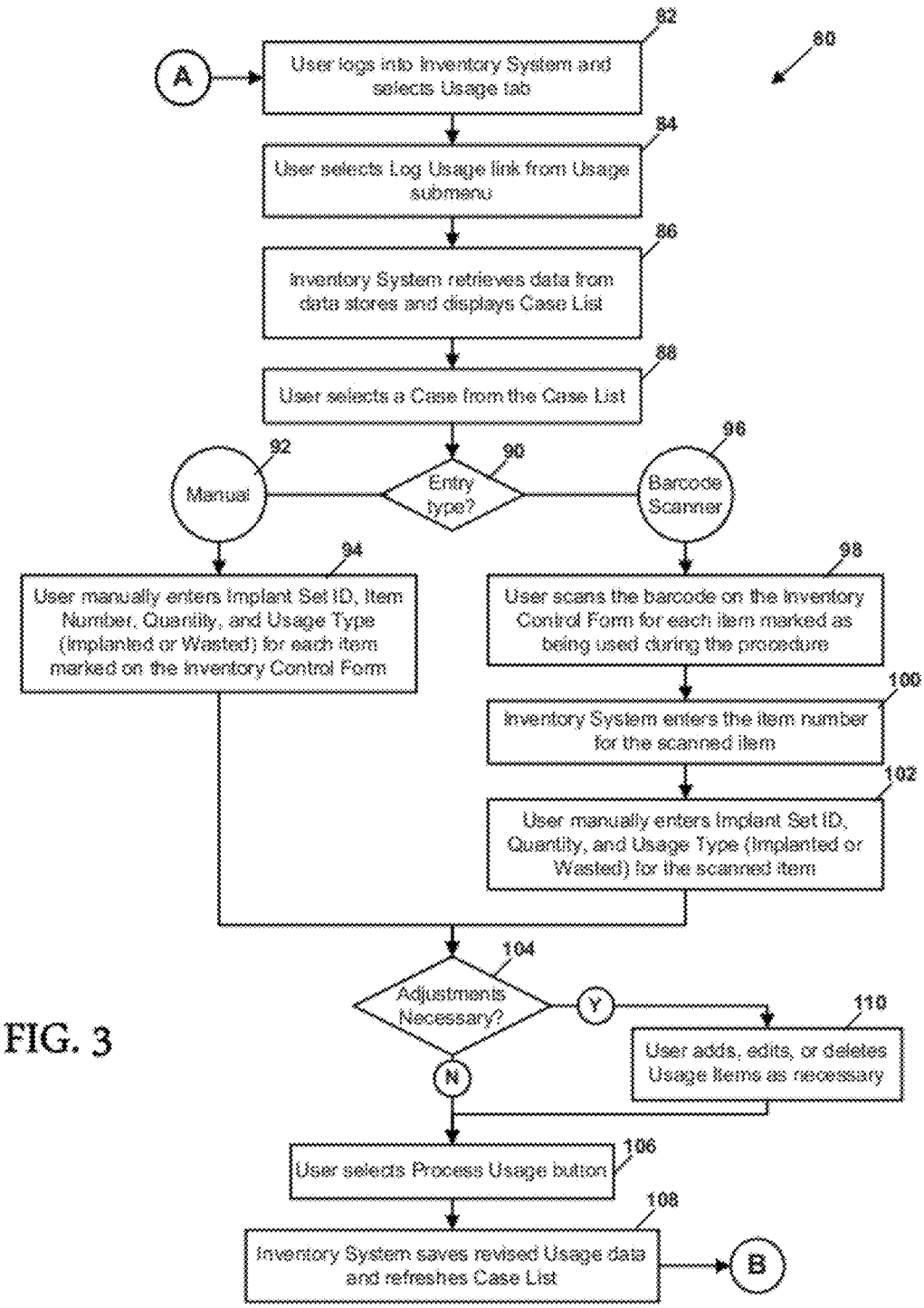
Figure 22:
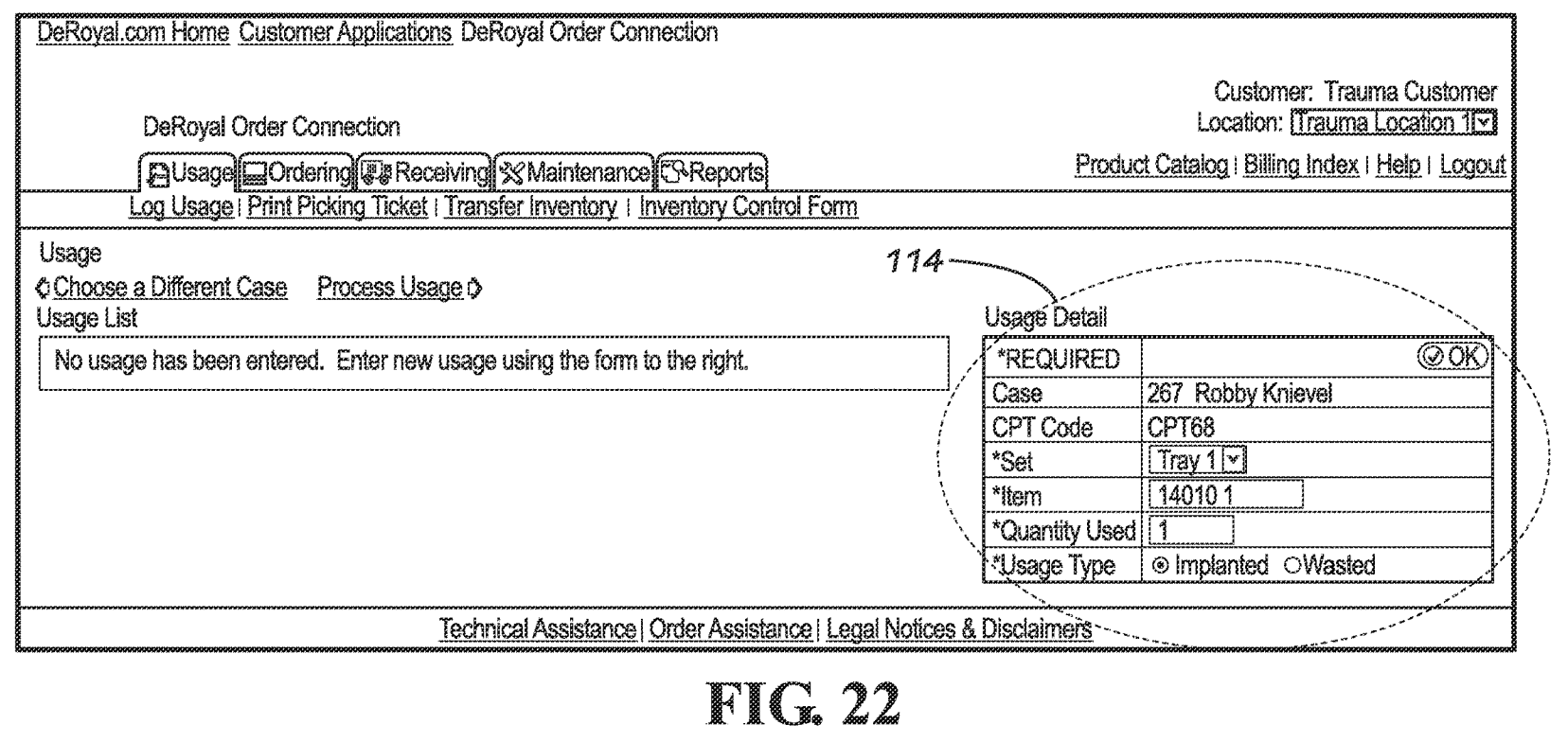
Figure 23:
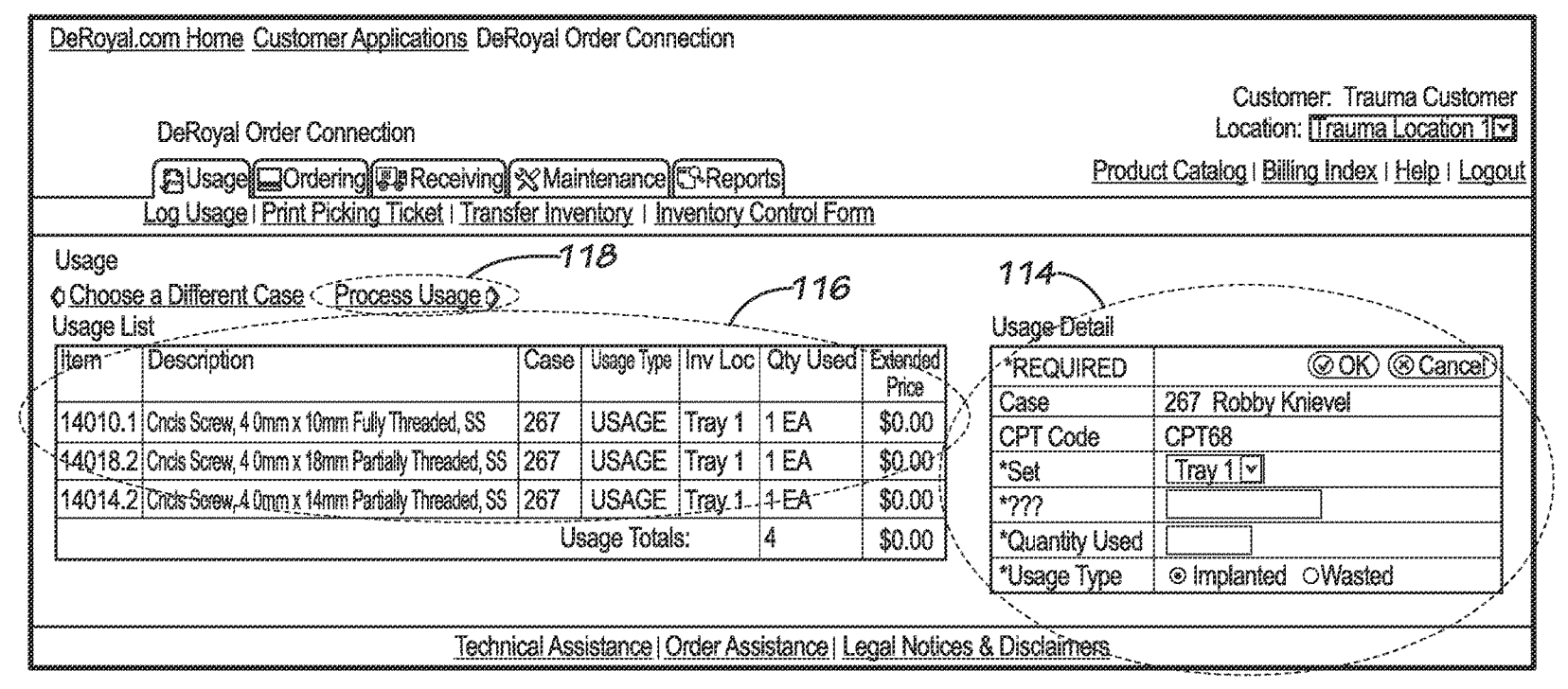

FIG. 3 depicts a process 80 for logging implant usage recorded on the Inventory Control Form 70 into the implant inventory database 32. To begin this process, a user logs into the inventory management application 28 running on the inventory management computer 26 via the Internet 16 and selects the Usage tab on the browser screen as depicted in FIG. 21 (step 82). This initiates execution of the Usage Module 28*a*. In the Usage submenu, the user selects the Log Usage link 110 (step 84) which causes the retrieval of case data from the implant inventory database 32 (step 86). The case data is displayed in a case list 112 from which the user selects a case under which implant usage will be logged (step 88). For example, if the user selects case number 267 from the case list 112, and no usage has yet been logged for this case, the screen as depicted in FIG. 22 will be displayed. For manual logging, the user keys in usage information in the Usage Detail block 114 using the input device 21. The usage information preferably includes the implant set ID number (such as Tray 1), an item number (such as 14010.1), quantity used (such as 1), and usage type (Implanted or Wasted) for each item marked on the Inventory Control Form (step 94). If logging using a barcode scanner, the user scans the barcode on the Inventory Control Form for each item marked as being used in the procedure (step 98), and the inventory management application 28 automatically enters the item number for the scanned item into the Usage block 114 (step 100). The user then manually enters the rest of the usage information in the Usage Detail block 114 (step 102). FIG. 23 depicts a list of items 116 entered as used for case number 267. If any adjustments are needed (step 104), the user may add, edit, or delete usage items by clicking on the item in the list 116 and making the changes in the input block 114 (step 110). When satisfied that the usage is correctly entered, the user clicks on the Process Usage link 118 (step 106) at which point the inventory management application 28 saves the revised usage data to the implant inventory database 32 and refreshes the case list 112 (step 108).

Figure 42:
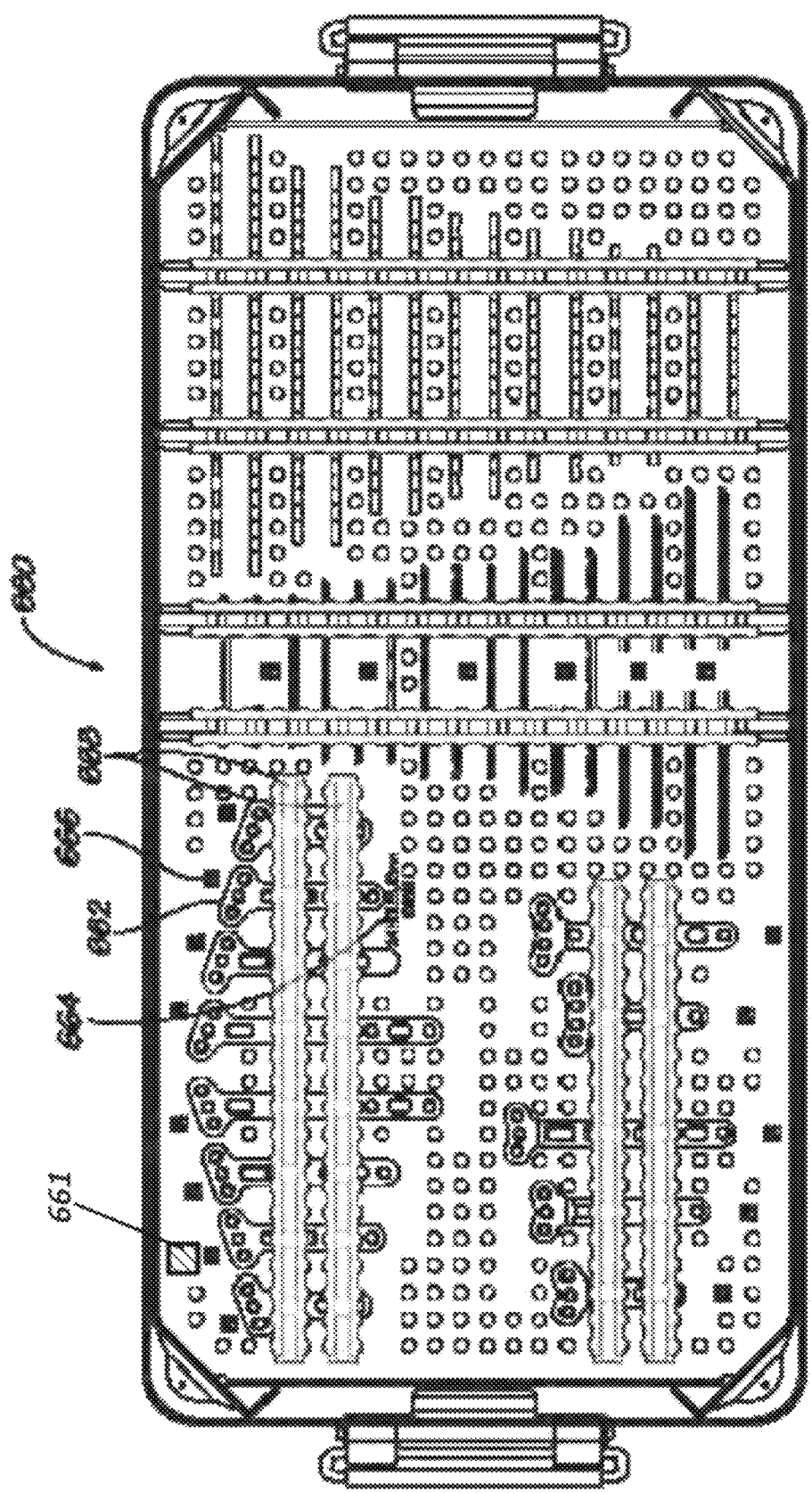
FIG. 42 depicts an embodiment of a tray of implants for use in a medical procedure.

In an alternative embodiment, instead of using an inventory control form 70 to record implant and material usage to be logged, a user gathers this information by visually inspecting an implant kit tray that was used in a medical procedure. An example of such a tray 660 is depicted in FIG. 42. The tray preferably bears a tray identification code 661, which may be a barcode or a Quick Response (QR) code or RFID tag, that uniquely identifies the tray. The user scans this code 661 to identify which tray is being processed. Each component on the tray is held in place in slots in a rack 668. A designated location for each component is indicated by a printed outline 662 of the component, a description with item number 664, and a barcode or QR code 666. If a component is not present in its designated slot after a procedure, it is considered to have been used during the procedure. A user may log usage by manually entering the item number 664 for the used component using the input device 21 as described above (step 94 of FIG. 3) or by scanning the barcode or QR code 666 as described above (step 100 of FIG. 3).

In another alternative embodiment, the user gathers the usage information by taking a digital photograph of the implant kit tray 660 that was used in a medical procedure. This photograph is emailed or otherwise electronically communicated to the inventory management computer 26 where the Usage Module 28*a* or other component of the inventory management application 28 automatically reads the tray identification code 661, detects empty slots in the item racks 668, reads the barcodes or QR codes 666 associated with those empty slots, and logs usage of the items in the implant inventory database 32 in association with the particular tray indicated by the tray identification code 661.

In yet another alternative embodiment, the inventory management application 28 displays a graphic of the tray 660 on the browser of the customer computer 18. The graphic includes "radio buttons" or other graphic indicators (such as check boxes) next to the outline 662 of the used components. The user indicates usage of items by pressing the radio button (or entering a check in a check box) next to the used items, and the inventory management application 28 logs usage of the items in the implant inventory database 32.

Figure 4:
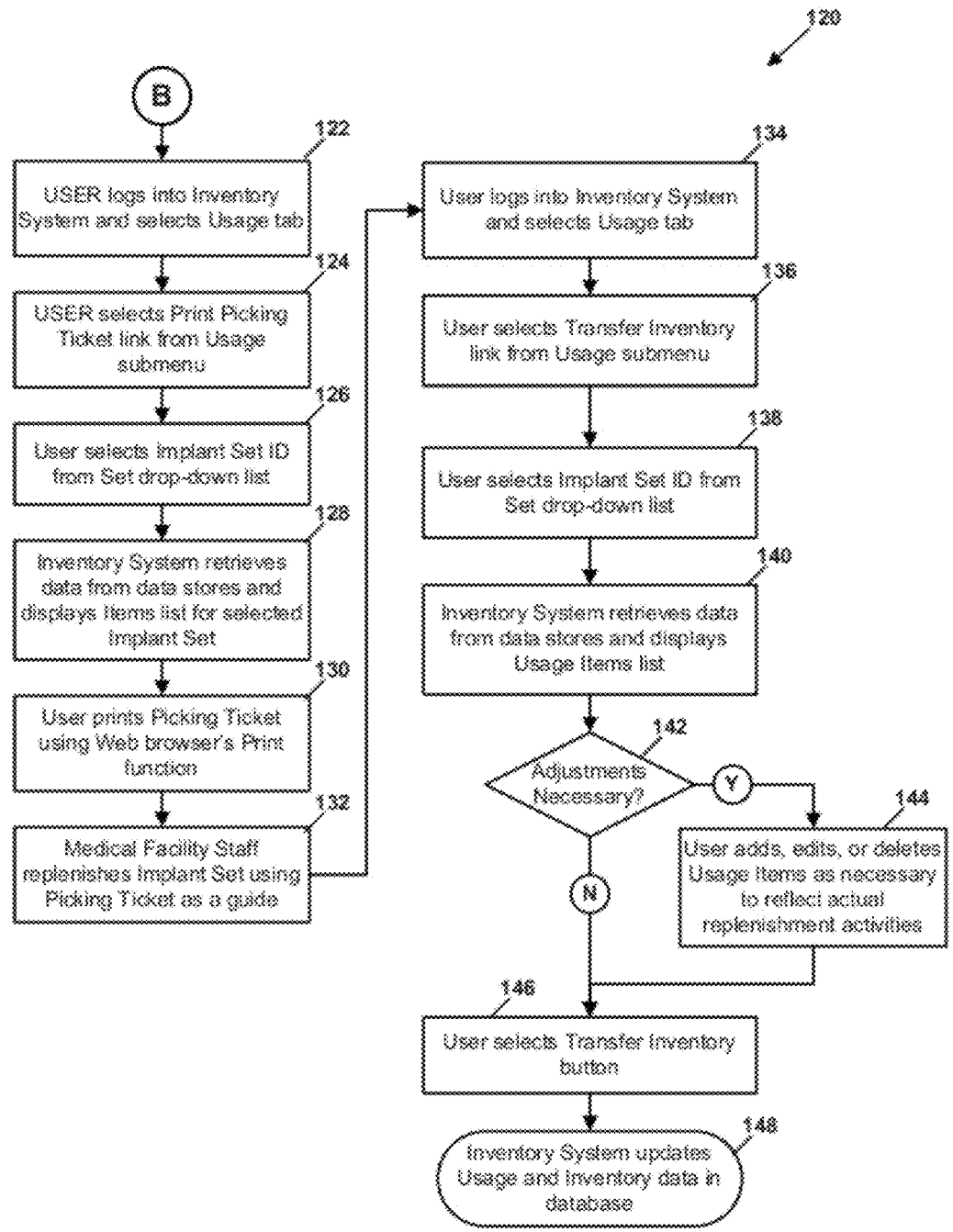

FIG. 4 depicts a process 120 for replenishing an implant set tray with implants, tools, or other materials that the customer used during a medical procedure. To begin this process, a user logs into the inventory management application 28 running on the inventory management computer 26 via the Internet 16 and selects the Usage tab on the browser screen as depicted in FIG. 24 (step 122). In the Usage submenu, the user selects the Print Picking Ticket link 150 which causes the drop-down list 152 of implant set IDs to appear (step 124). The user then selects one of the implant set IDs from the list 152 (step 126) at which point the inventory management application 28 retrieves data from the implant inventory database 32 for the selected implant set and displays the item list 154 for the selected set on the screen (step 128). Using the browser's print function, the user can now print the Picking Ticket (step 130). In preferred embodiments, the Picking Ticket shows all items that have been used and provides a list of items and the quantity of each to be retrieved from the supply closet to replenish the implant set tray. The Picking Ticket will also indicate the quantity of items available in the supply closet, and whether there is sufficient inventory available there to restock the tray. Using the Picking Ticket as a guide, the medical facility staff can replenish the implant set tray using the available stock in the supply closet (step 132).

Figure 25:
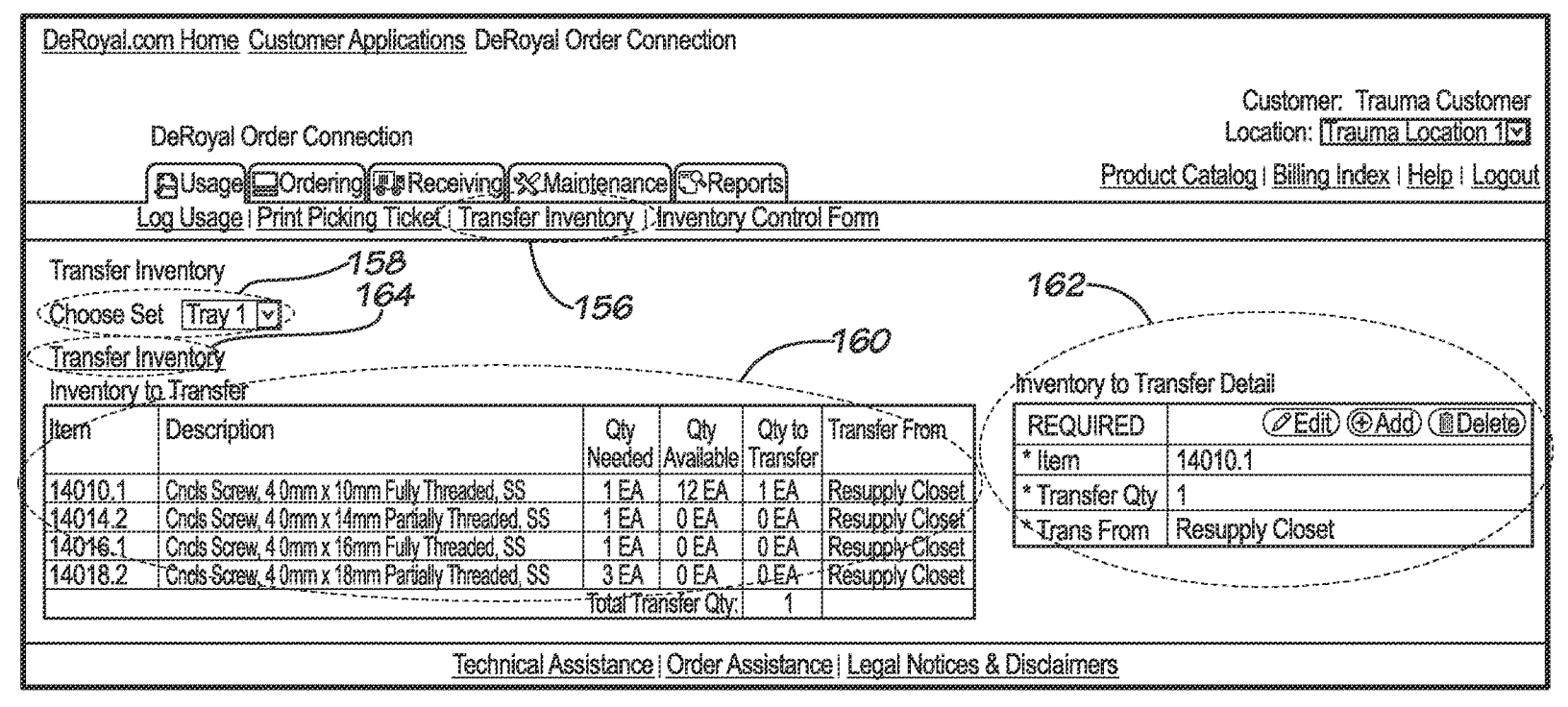

With continued reference to FIG. 4, a user can record the transfer of inventory from the supply closet to the implant tray. To begin this process, a user logs into the inventory management application 28 running on the inventory management computer 26 via the Internet 16 and selects the Usage tab on the browser screen as depicted in FIG. 25 (step 134). In the Usage submenu, the user selects the Transfer Inventory link 156 which causes the drop-down list 158 of implant set IDs to appear (step 136). The user then selects one of the implant set IDs from the list 158 (step 138) at which point the inventory management application 28 retrieves data from the implant inventory database 32 for the selected implant set and displays on the screen the list 160 of items to transfer from inventory for the selected set (step 140). If any adjustments are needed (step 142), the user may add, edit, or delete usage items by clicking on the item in the list 160 and making the changes in the input block 162 (step 144). When satisfied that the transfer information is correctly entered, the user clicks on the Transfer Inventory link 164 (step 146) at which point the inventory management application 28 updates the usage and inventory data in the implant inventory database 32 (step 148).

Figure 5:
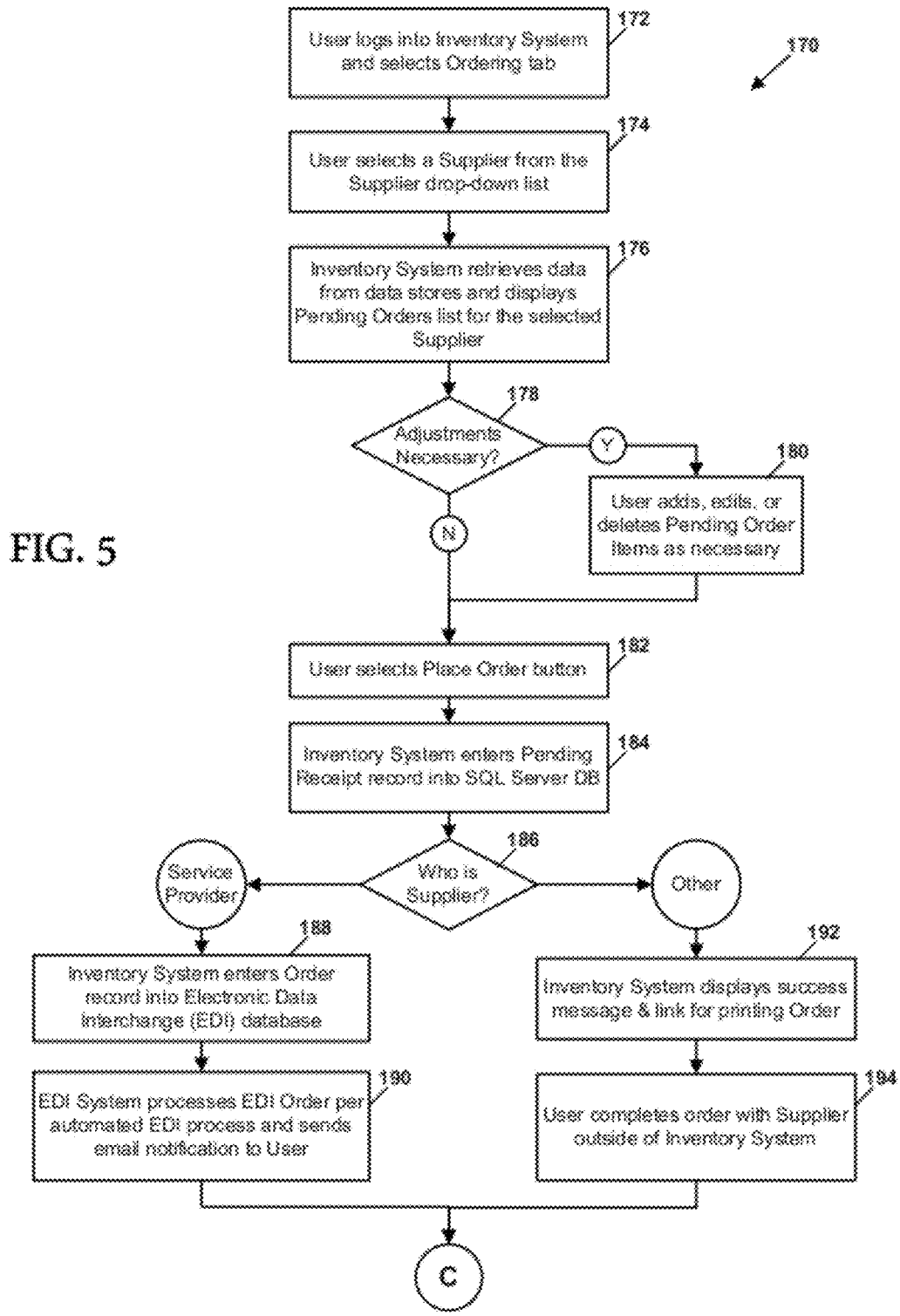
Figure 26:
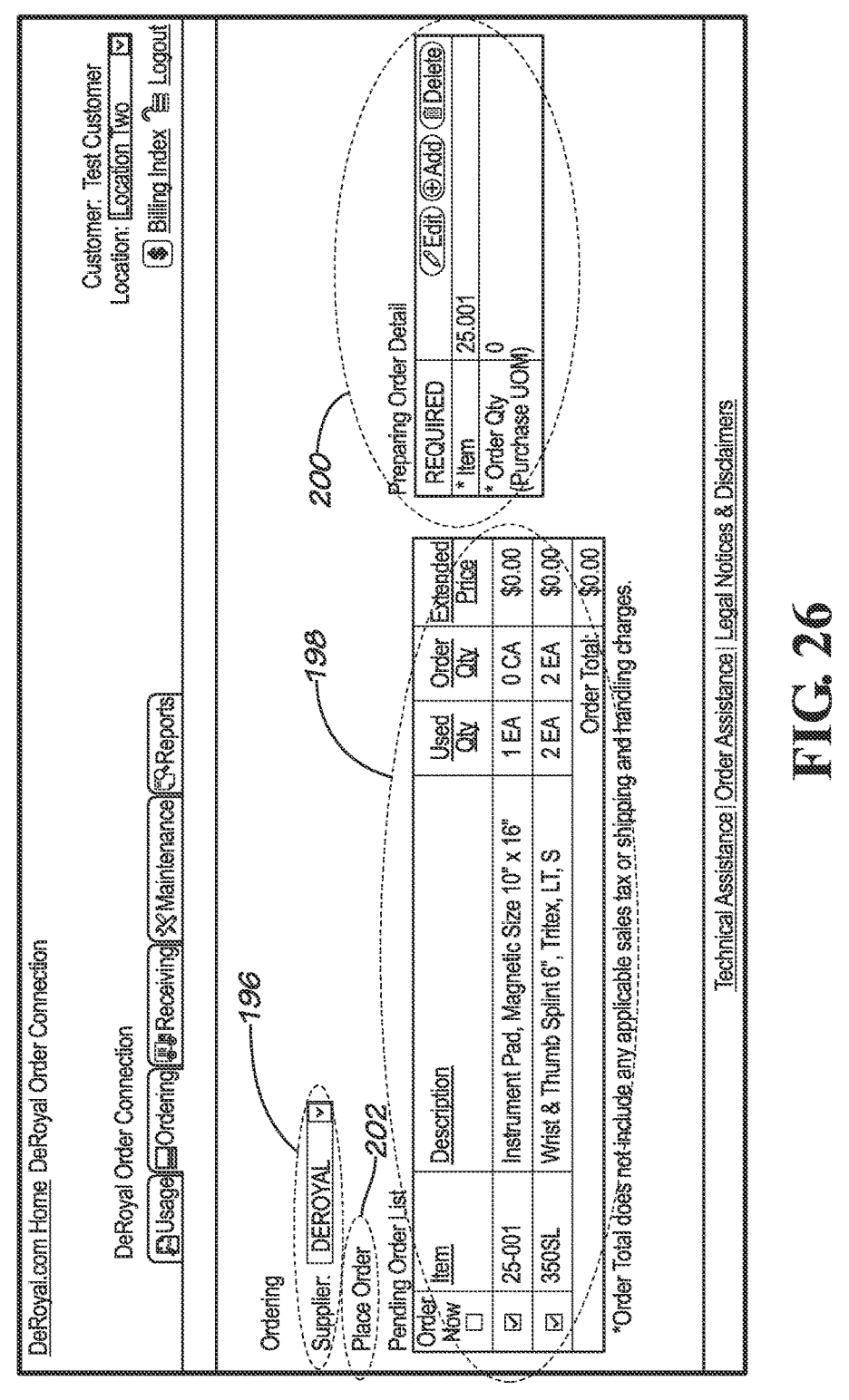

FIG. 5 depicts a process 170 for ordering items from a supplier to replenish stock in the customer supply closet. To begin this process, a user logs into the inventory management application 28 running on the inventory management computer 26 via the Internet 16 and selects the Ordering tab on the browser screen as depicted in FIG. 26 (step 172). The user then selects a Supplier from the supplier drop-down list 196 (step 174). The Ordering Module 28*b* of the inventory management application 28 retrieves data indicating pending orders for items and displays this information in a list 198 on the screen (step 176). This list 198 shows the number of items that have been used since the last order was placed with the supplier. The list also shows the quantity of each item to be ordered and the price of each item. If adjustments to the list 198 are needed (step 178), the user can add, edit, or delete items from the pending order using the input block 200. When satisfied that the list is complete, the user selects the Place Order link 202 (step 182) at which point the inventory management application 28 enters a pending receipt record in the implant inventory database 32 (step 184). If the supplier selected at step 174 is also the inventory management service provider, the inventory management application 28 enters the order record into the EDI system 30 (step 188), and the EDI system 30 processes the EDI order record according to a standardized EDI process and sends a confirmatory email to the user (step 190). If the supplier selected at step 174 is not the inventory management service provider, the inventory management application 28 displays a success message and a link for printing an order form for the selected supplier (step 192). The user then completes the order using the order form outside the implant inventory management system 10 (step 194).

In some embodiments, the Ordering Module 28*b* provides an option for a customer who is ordering DME items for a particular insurance provider's patient to bypass a POD and order the DME items directly from the equipment manufacturer. For such situations, the replenishment and billing information flow can be tailored to include or bypass the POD based upon the insurance provider. A POD may not be eligible to bill certain insurance providers based upon the POD's status relative to the insurance provider. For example, a POD may not be authorized to bill a particular insurance provider that the hospital is eligible to bill. Where the patient is eligible to have the product covered, the POD is not guaranteed eligibility to bill the insurance provider.

In some embodiments, the Ordering Module 28*b* can accommodate either construct-based pricing or line-item pricing when ordering medical items, such as implants. Construct-based pricing allows for bundling of items based on the components needed to complete a specific medical procedure, whereas line-item pricing sets a price for each individual item separately. Construct-based pricing allows for additional ancillary items to be included in a set for a medical procedure without increasing the set construct pricing cost. Construct-based pricing helps to determine cost per procedure and control said costs.

Figure 6:
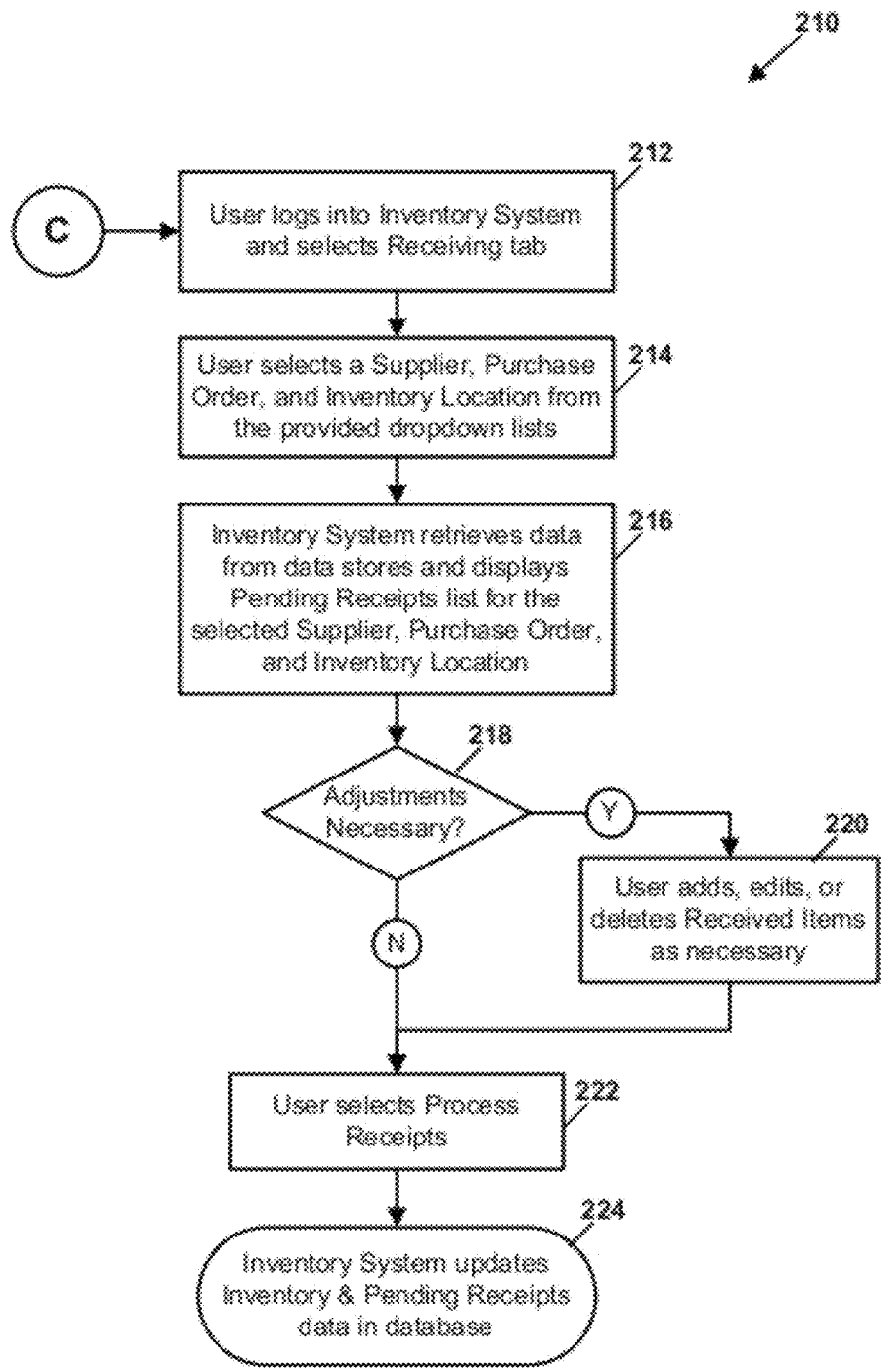
Figure 27:
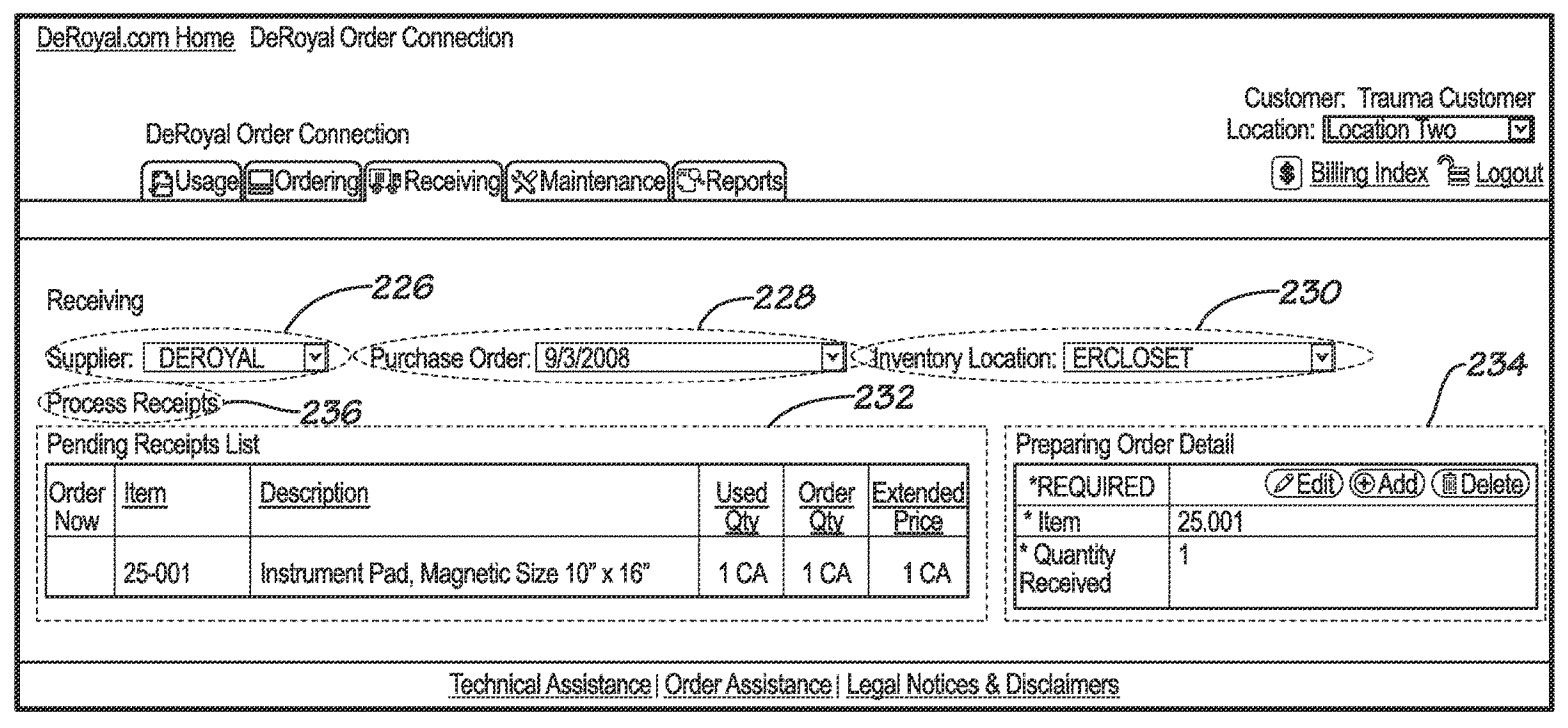

FIG. 6 depicts a process 210 for receiving items ordered from a supplier into customer inventory. To begin this process, a user logs into the inventory management application 28 running on the inventory management computer 26 via the Internet 16 and selects the Receiving tab on the browser screen as depicted in FIG. 27 (step 212). The user then selects a Supplier from the supplier drop-down list 226, a purchase order from drop-down list 228, and an inventory location from drop-down list 230 (step 214). The inventory management application 28 retrieves data indicating pending receipts for items for the selected supplier and purchase order, and displays this information in a list 232 on the screen (step 216). This list 232 shows items that the customer has ordered and should be receiving. The selected inventory location determines to which location the system will add the received items. In the example of FIG. 27, the selected inventory location is "ERCLOSET." The inventory location is important, because in preferred embodiments, the system will not allow use of more inventory than is available in the inventory location. As shown in FIG. 27, for each item, the list 232 includes the item number, description, quantity ordered, quantity open, and quantity received. If the customer received the products listed, the user clicks on the box under "Receive" and the quantity received field will be populated with the quantity ordered. If adjustments in the quantity received are needed, the user may use the input block 234 to add, edit, or delete received items (step 220). When modifications are complete, and all items to be received have the check mark, the user selects the Process Receipts link 236 (step 222) at which point the inventory management application 28 updates the inventory and pending receipts in the implant inventory database 32 (step 224).

Figure 7:
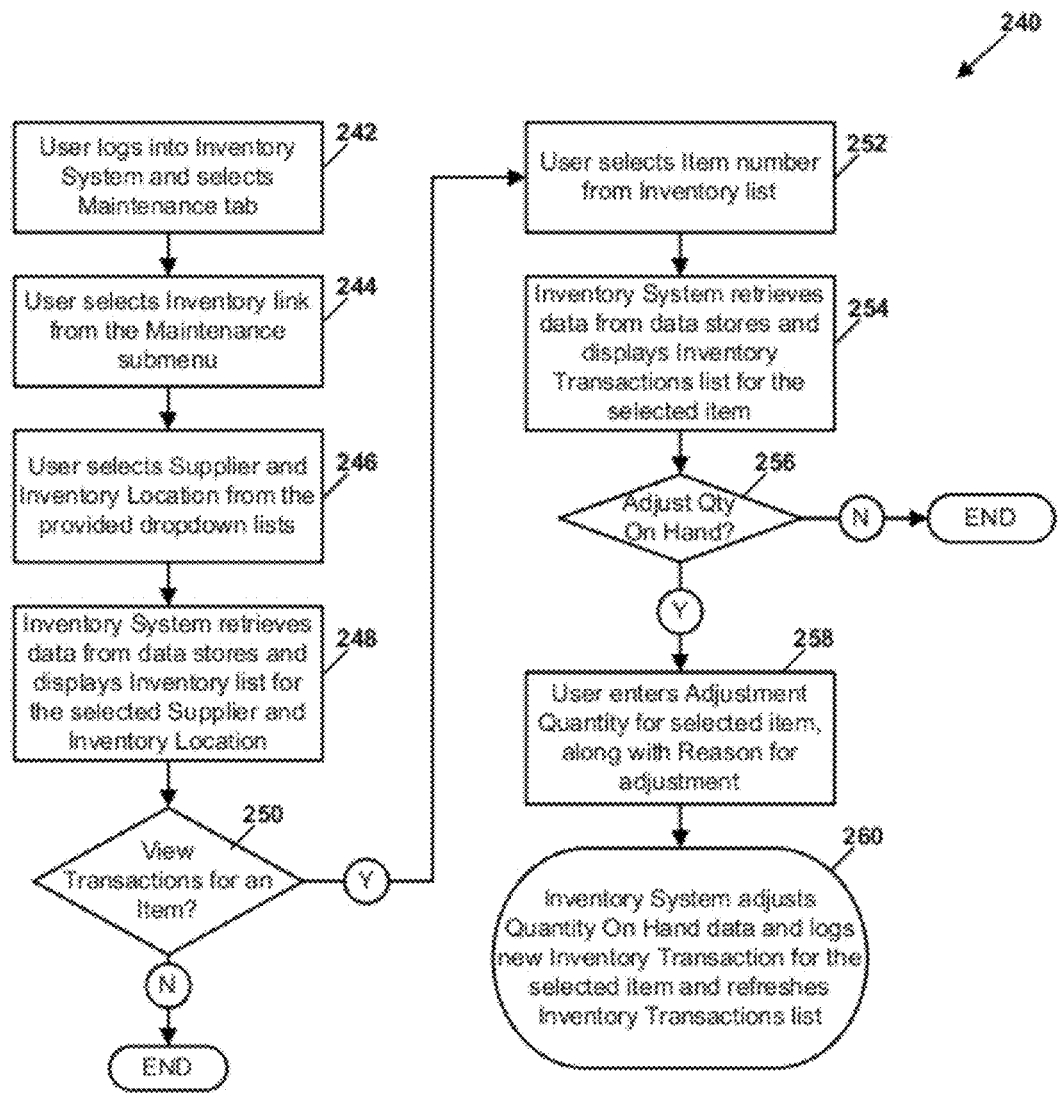

FIG. 7 depicts a process 240 for viewing and maintaining a customer's inventory. To begin this process, a user logs into the inventory management application 28 running on the inventory management computer 26 via the Internet 16 and selects the Maintenance tab on the browser screen as depicted in FIG. 28 (step 242) and selects the Inventory link 262 in the Maintenance submenu (step 244). The user then selects a Supplier from the supplier drop-down list 264 and an inventory location from drop-down list 266 (step 246). The inventory management application 28 retrieves data indicating inventory from the selected supplier and inventory location, and displays this information in a list 268 on the screen (step 248). If a user wants to view transactions for an item, the user selects the item from the list 268 (step 252), and the system retrieves and displays inventory data for the selected item (step 254) as shown in FIG. 29. The user can then adjust the quantity on hand for the selected item and enter a reason for the adjustment (step 258). The inventory management application 28 then adjusts the quantity on hand accordingly, logs the inventory transaction, and refreshes the inventory transactions list (step 260).

Figure 8:
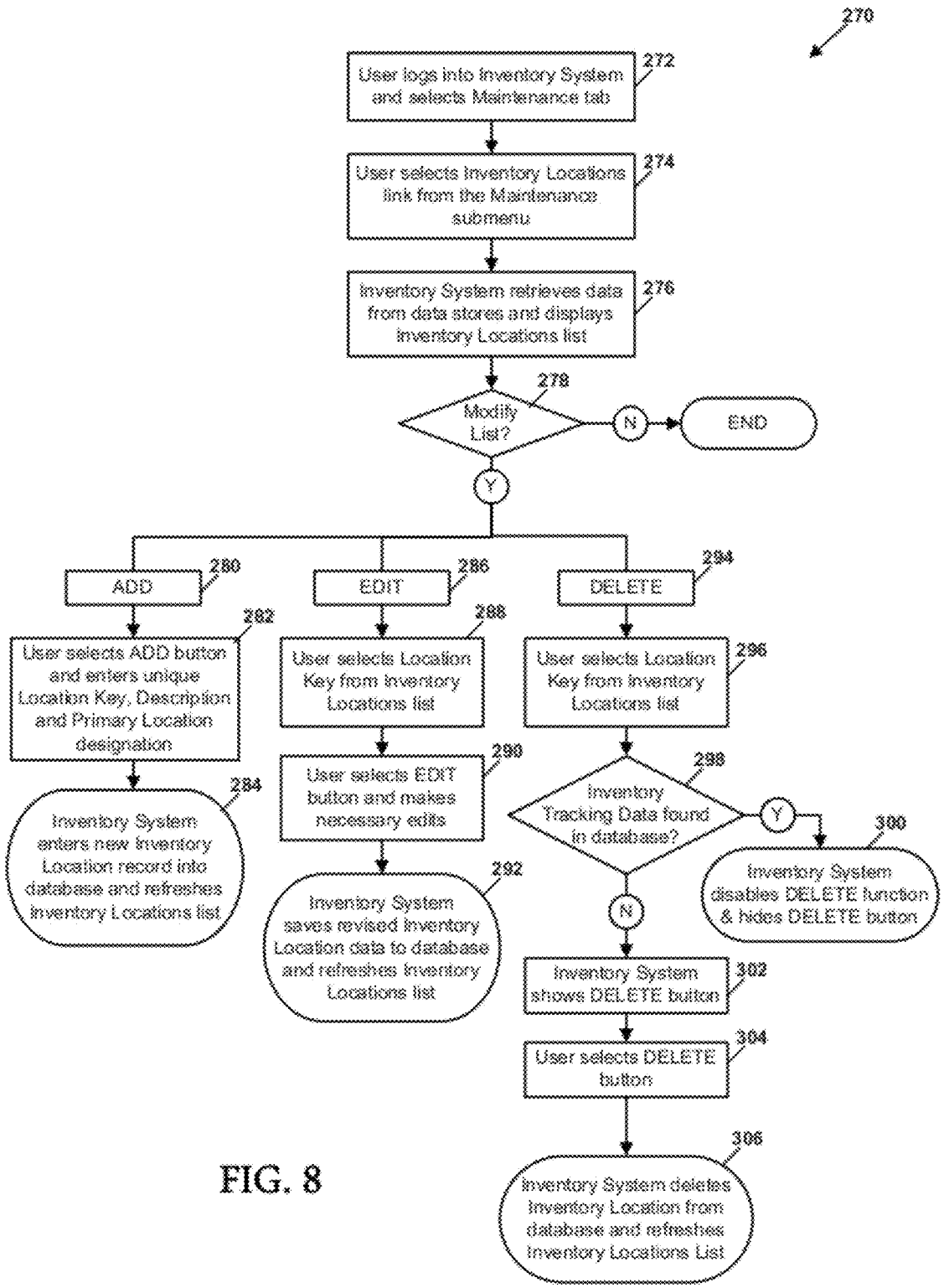

FIG. 8 depicts a process 270 for adding and deleting a customer's inventory locations, and changing the customer's primary location at which inventory is stored. To begin this process, a user logs into the inventory management application 28 running on the inventory management computer 26 via the Internet 16 and selects the Maintenance tab on the browser screen as depicted in FIG. 30 (step 272) and selects the Inventory Locations link 308 in the Maintenance submenu (step 274). The inventory management application 28 retrieves data indicating the customer's inventory locations, and displays this information in an inventory location list 310 on the screen (step 276). Using the options provided in the Inventory Location Details box 312, the user can add locations (steps 280-284), edit locations (steps 286-292), or delete locations (steps 294-306) as shown in FIG. 8.

Figure 9:
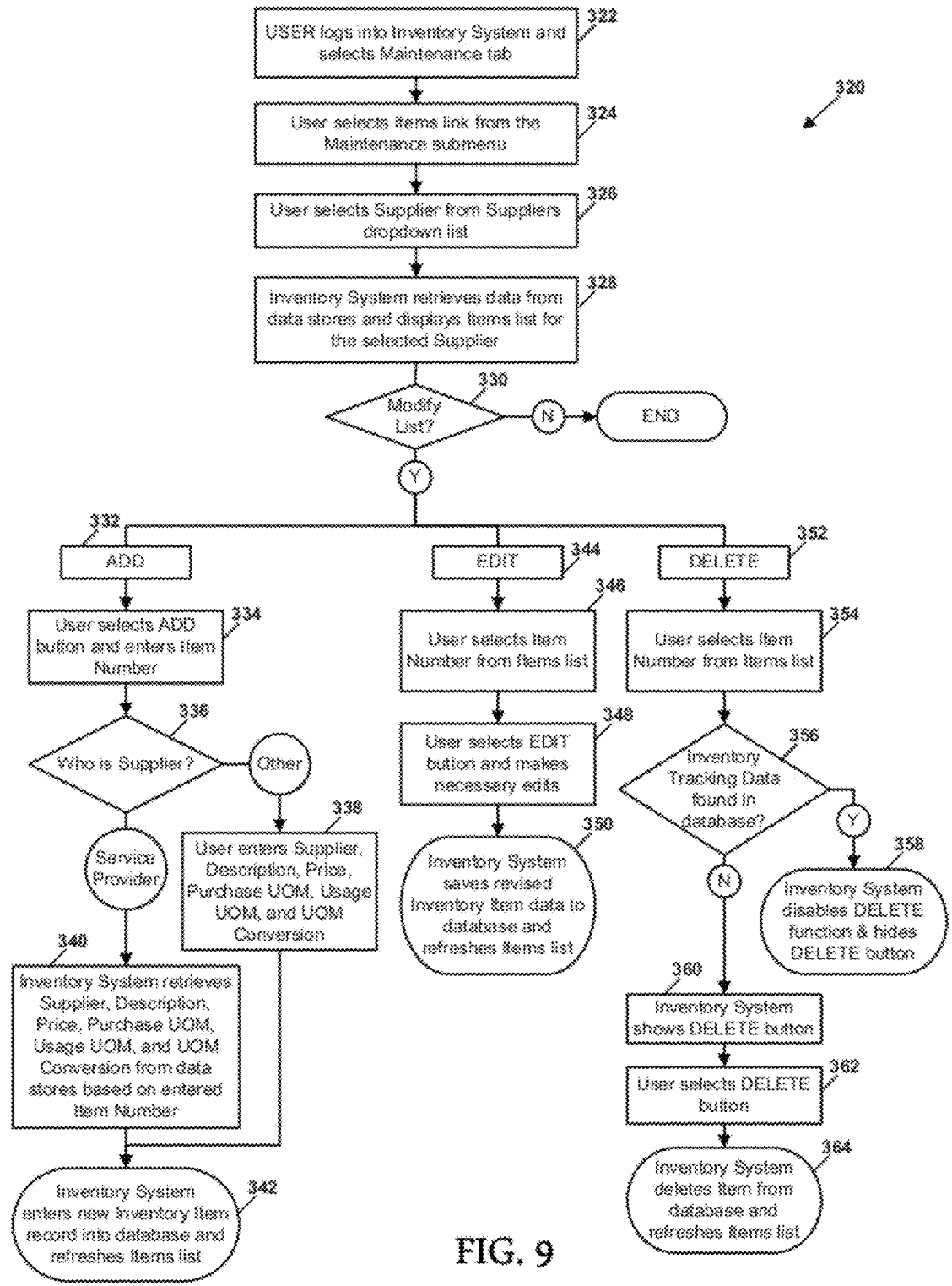

FIG. 9 depicts a process 320 which allows the customer to add items to inventory that the customer wishes to begin ordering from a supplier. To begin this process, a user logs into the inventory management application 28 running on the inventory management computer 26 via the Internet 16 and selects the Maintenance tab on the browser screen as depicted in FIG. 31 (step 322) and selects the Items link 366 in the Maintenance submenu (step 324). The user then selects a particular supplier or "all suppliers" from a supplier drop-down list 368 (step 326). The inventory management application 28 retrieves data indicating the items available from the selected supplier(s), and displays this information in an items list 370 on the screen (step 328). Using the options provided in the Item Details box 372, the user can add items (steps 332-342), edit items (steps 344-350), or delete locations (steps 352-364) as shown in FIG. 9.

Figure 10:
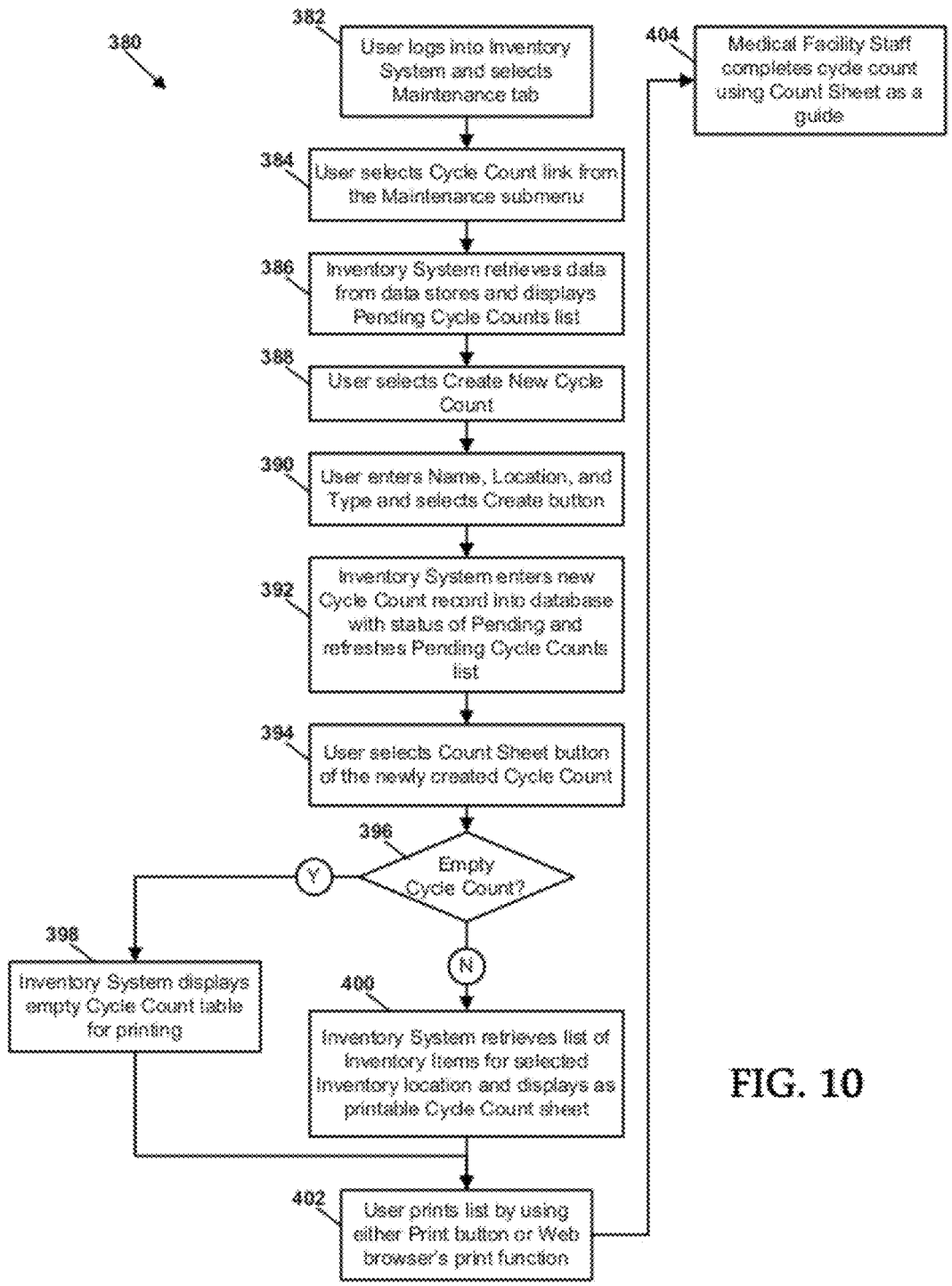
Figure 32:
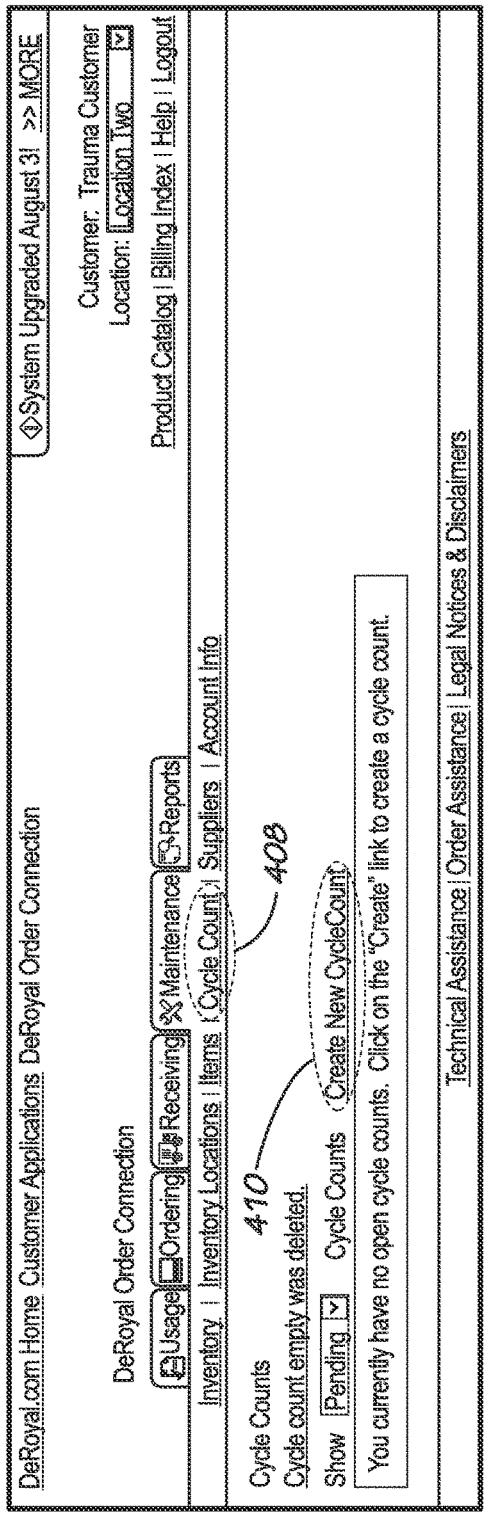
Figure 33:
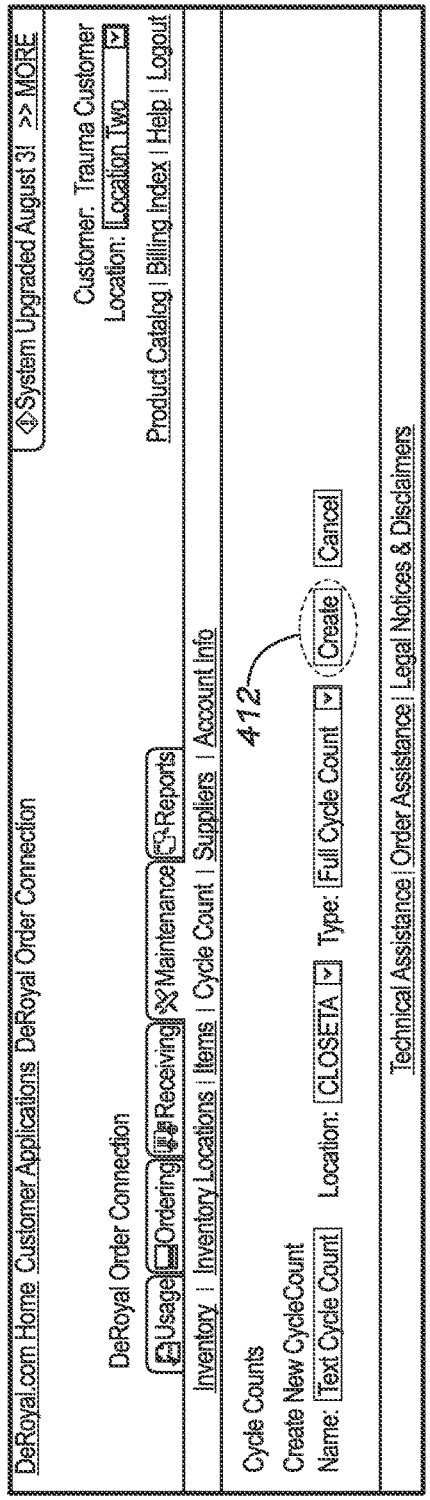
Figure 34:
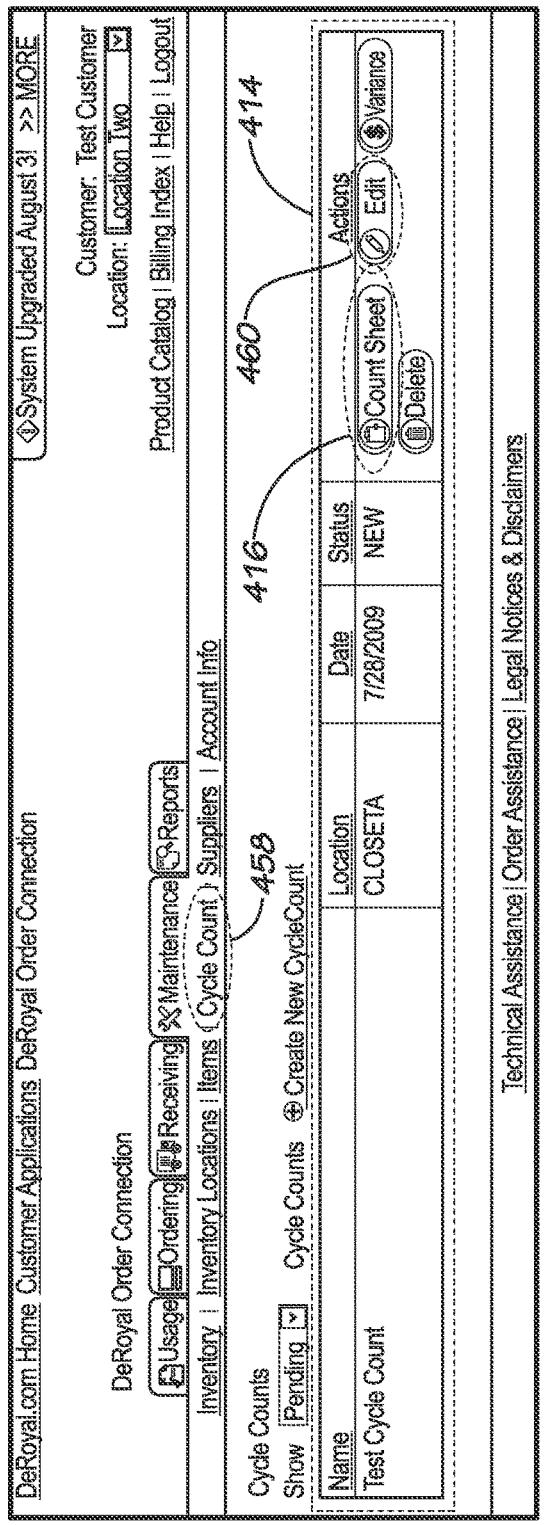

FIG. 10 depicts a process 380 which allows the customer to create and view cycle counts for the items in inventory, where a cycle count is a count of a subset of a total inventory which is taken at some particular frequency or cycle. To begin this process, a user logs into the inventory management application 28 running on the inventory management computer 26 via the Internet 16 and selects the Maintenance tab on the browser screen as depicted in FIG. 32 (step 382) and selects the Cycle Count link 408 in the Maintenance submenu (step 384). The inventory management application 28 retrieves cycle count data and displays this information as a Pending Cycle Counts list on the screen (step 386). If no open cycle counts exist, a corresponding message is displayed as shown in FIG. 32. The user then selects the Create New Cycle Count link 410 (step 388), at which point data entry dialog boxes are displayed which allow for entry of a cycle count name, inventory location, and type of cycle count (step 390). Upon selection of the Create button 412, the inventory management application 28 enters a new pending cycle count record into the implant inventory database 32 and refreshes the Pending Cycle Counts list 414 as shown in FIG. 34 (step 392). For the newly created cycle count, the user selects the Count Sheet button 416 (step 394). If the cycle count is empty (step 396), the inventory management application 28 displays an empty cycle count table for printing (step 398). If the user chose to create a full cycle count (step 396), the inventory management application 28 retrieves a list of inventory items for the selected inventory location and displays the list 418 as a cycle count sheet (step 400) that the user may print (step 402) as shown in FIG. 35. The user may then complete the cycle count using the cycle count sheet as a guide (step 404).

Figure 11:
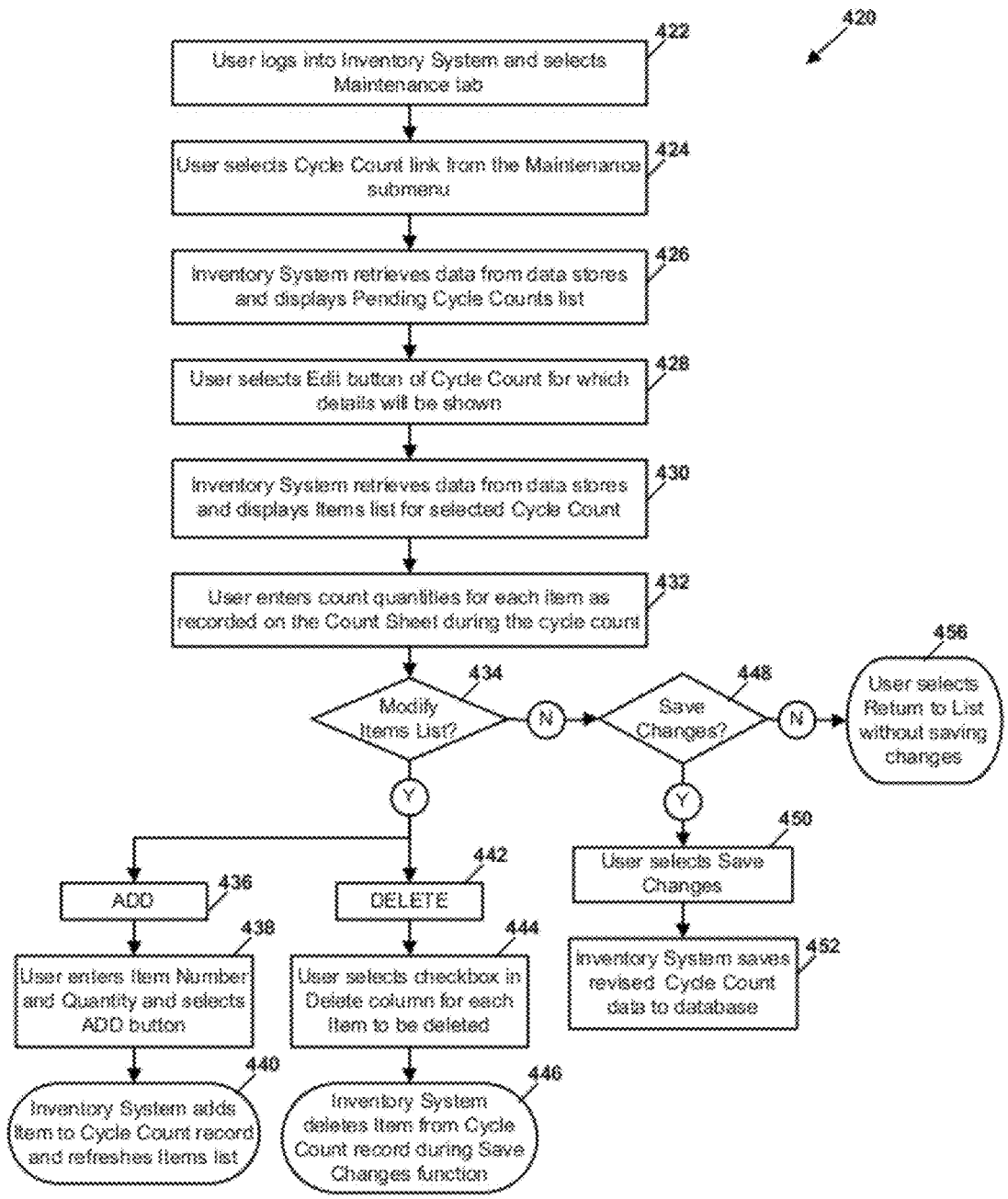
Figure 36:
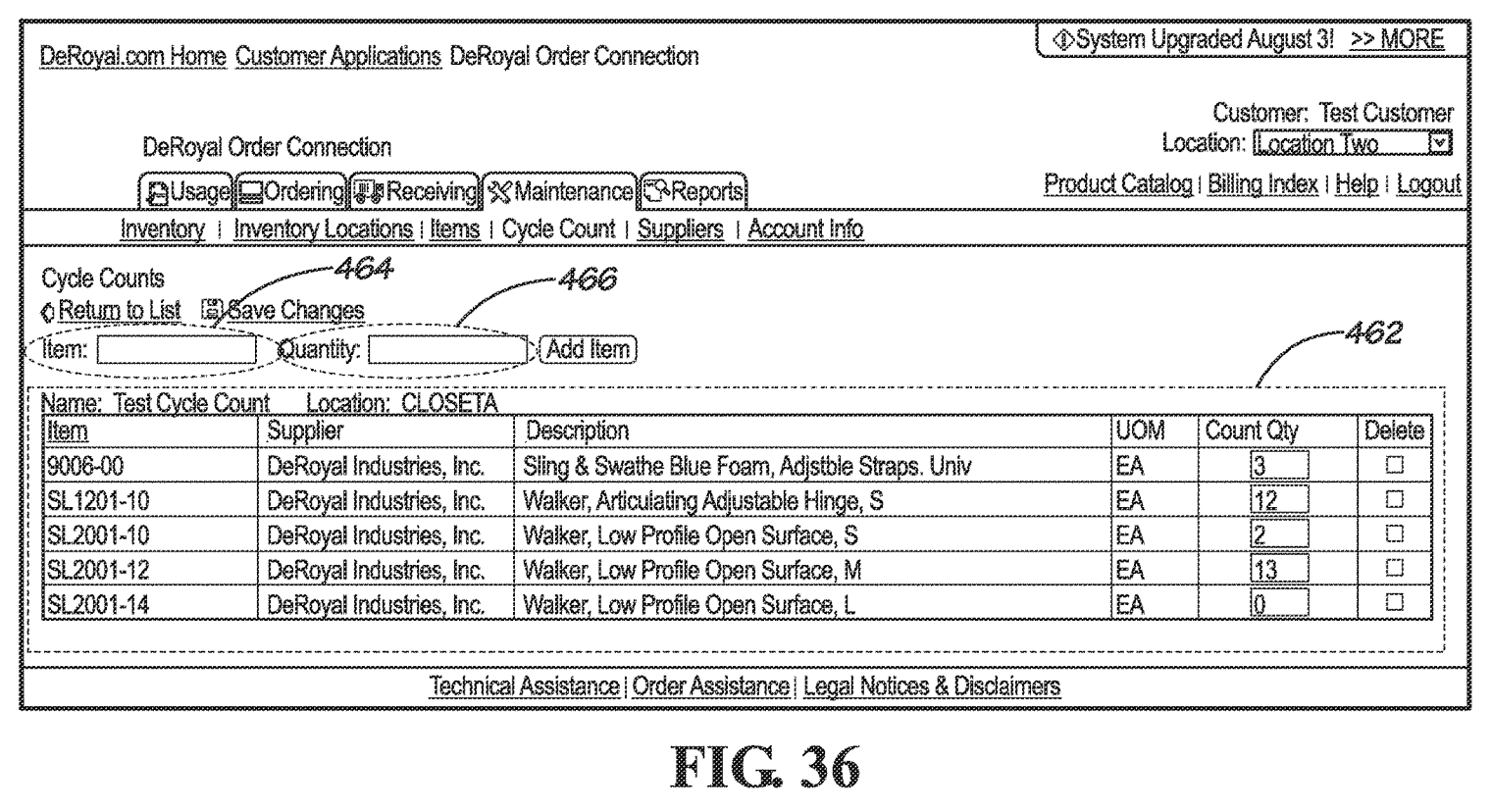

FIG. 11 depicts a process 420 which allows the customer to edit a cycle count. To begin this process, a user logs into the inventory management application 28 running on the inventory management computer 26 via the Internet 16 and selects the Maintenance tab on the browser screen as depicted in FIG. 34 (step 422) and selects the Cycle Count link 458 in the Maintenance submenu (step 424). The inventory management application 28 retrieves cycle count data and displays this information as a Pending Cycle Counts list 414 on the screen (step 426). The user clicks on the Edit button 460 of the cycle count to be edited (step 428) at which point the inventory management application 28 retrieves item data for the selected cycle count and displays this information as an Items list 462 on the screen as shown in FIG. 36 (step 430). The user can then enter count quantities for each item as recorded on the Count Sheet (step 432) using the Item box 464 and the Quantity box 466 as set forth in steps 436-440. The user can also add items and count quantities to the cycle count. The user can also delete items (steps 442-446), and then save the changes (steps 448-456) as shown in FIG. 11.

Figure 12:
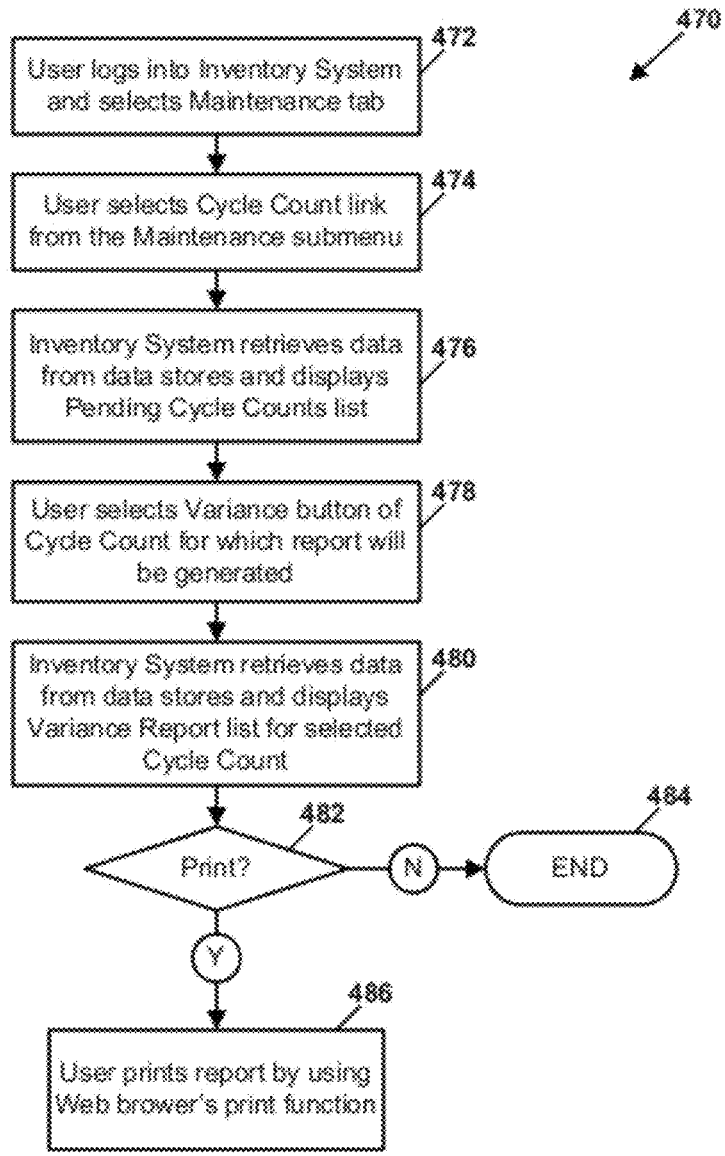
Figure 37:
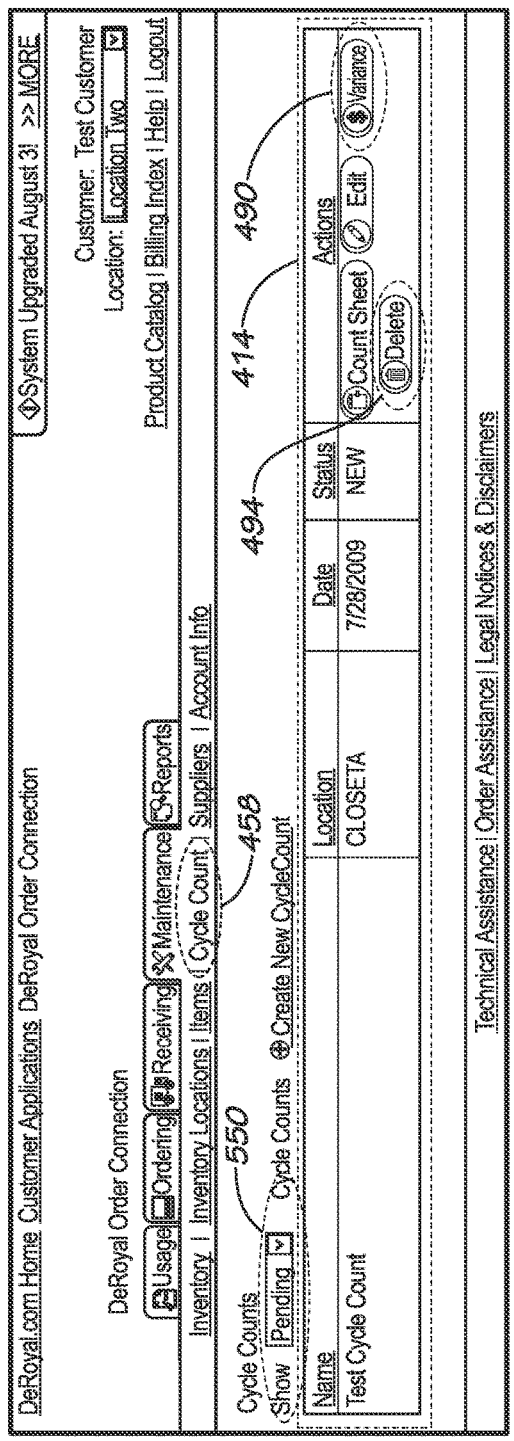

FIG. 12 depicts a process 470 which allows the customer to view and print a variance report. To begin this process, a user logs into the inventory management application 28 running on the inventory management computer 26 via the Internet 16 and selects the Maintenance tab on the browser screen as depicted in FIG. 37 (step 472) and selects the Cycle Count link 458 in the Maintenance submenu (step 474). The inventory management application 28 retrieves cycle count data and displays this information as a Pending Cycle Counts list 414 on the screen (step 476). The user clicks on the Variance button 490 of the cycle count for which a variance report is desired (step 478) at which point the inventory management application 28 retrieves variance data for the selected cycle count and displays this information as a Variance Report 492 on the screen as shown in FIG. 38 (step 480). The Variance Report lists quantities and dollar differences between items on hand and the number of items counted. The user can print the report such as by using the browser's print function (steps 482 and 486).

Figure 13:
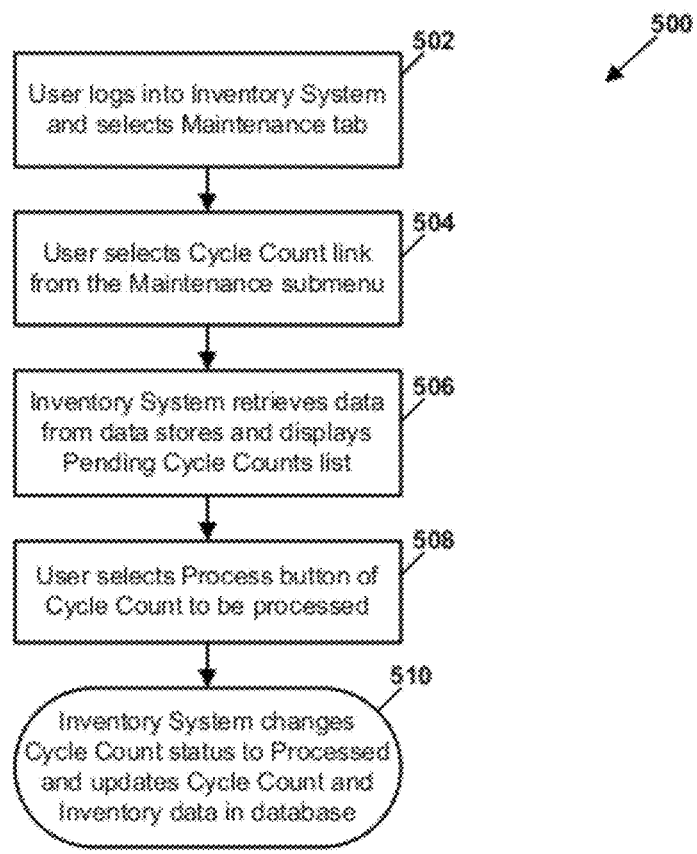

FIG. 13 depicts a process 500 which allows the customer to process the cycle count once every item in the cycle count has a count quantity. The Process function makes all necessary adjustments to the quantity on hand to reflect the quantity actually counted in the cycle count. To begin this process, a user logs into the inventory management application 28 running on the inventory management computer 26 via the Internet 16 and selects the Maintenance tab on the browser screen as depicted in FIG. 37 (step 502) and selects the Cycle Count link 458 in the Maintenance submenu (step 504). The inventory management application 28 retrieves cycle count data and displays this information as a Pending Cycle Counts list 414 on the screen (step 506). The user clicks on the Process button 494 of the cycle count to be processed (step 508) at which point the inventory management application 28 processes and updates the cycle count and the implant inventory database 32 and changes the cycle count status to reflect that it has been processed (step 510).

Figure 14:
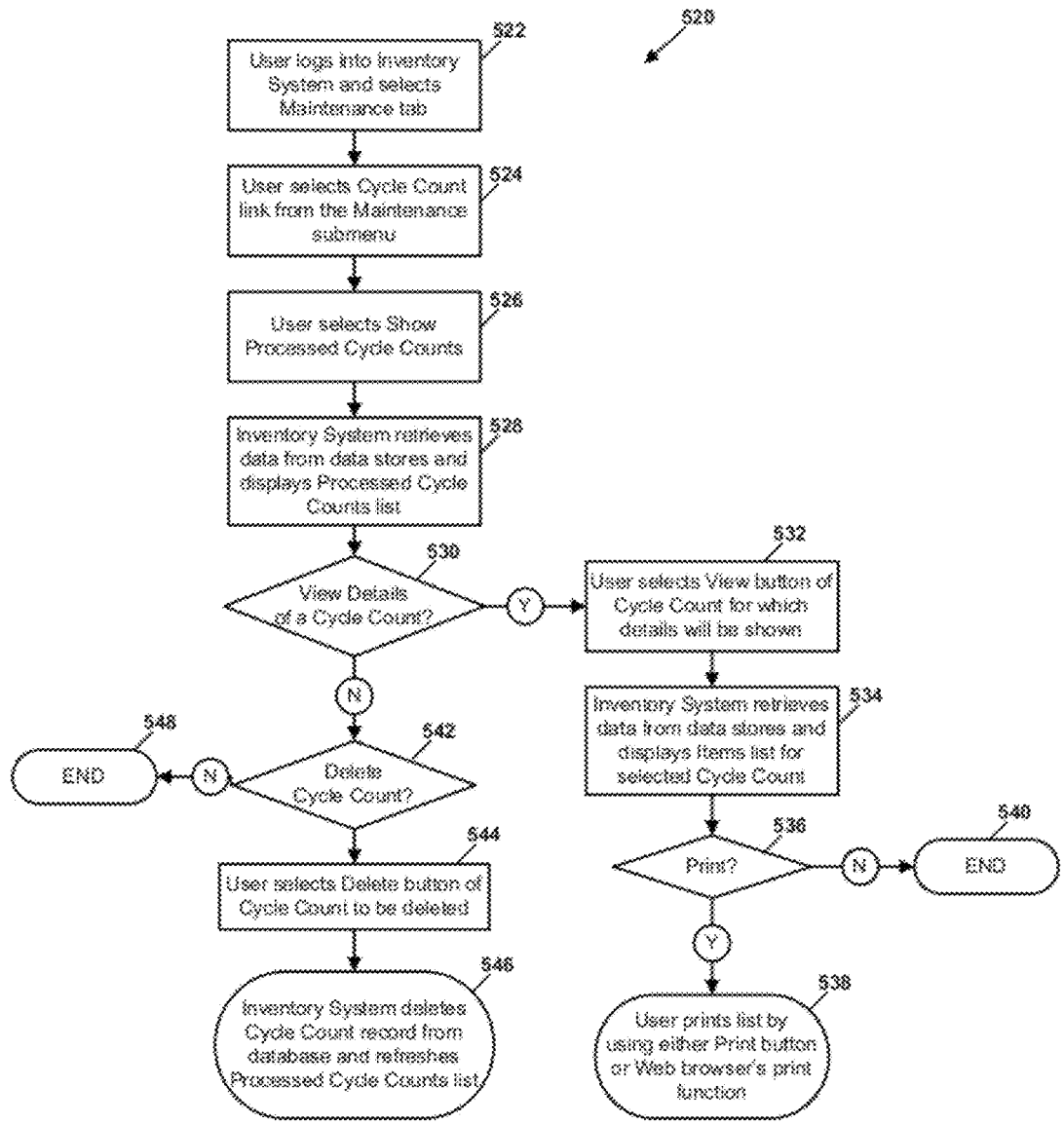

FIG. 14 depicts a process 520 which allows the customer to view a processed cycle count. To begin this process, a user logs into the inventory management application 28 running on the inventory management computer 26 via the Internet 16 and selects the Maintenance tab on the browser screen as depicted in FIG. 37 (step 522) and selects the Cycle Count link 458 in the Maintenance submenu (step 524). The user then selects to show "Processed" cycle counts from the dropdown menu 550 (step 526), at which point the inventory management application 28 retrieves cycle count data and displays this information as a Processed Cycle Counts list on the screen (step 528). The user can then choose to view details of the processed cycle count (steps 530 and 532) at which point the inventory management application 28 retrieves and displays an item list for the selected processed cycle count (step 534). The user can print the list such as by using the browser's print function (steps 536 and 538). The user may also choose to delete a processed cycle count (steps 542 and 544) at which point the inventory management application 28 deletes the selected processed cycle count and updates the processed cycle count list accordingly (step 546).

Figure 15:
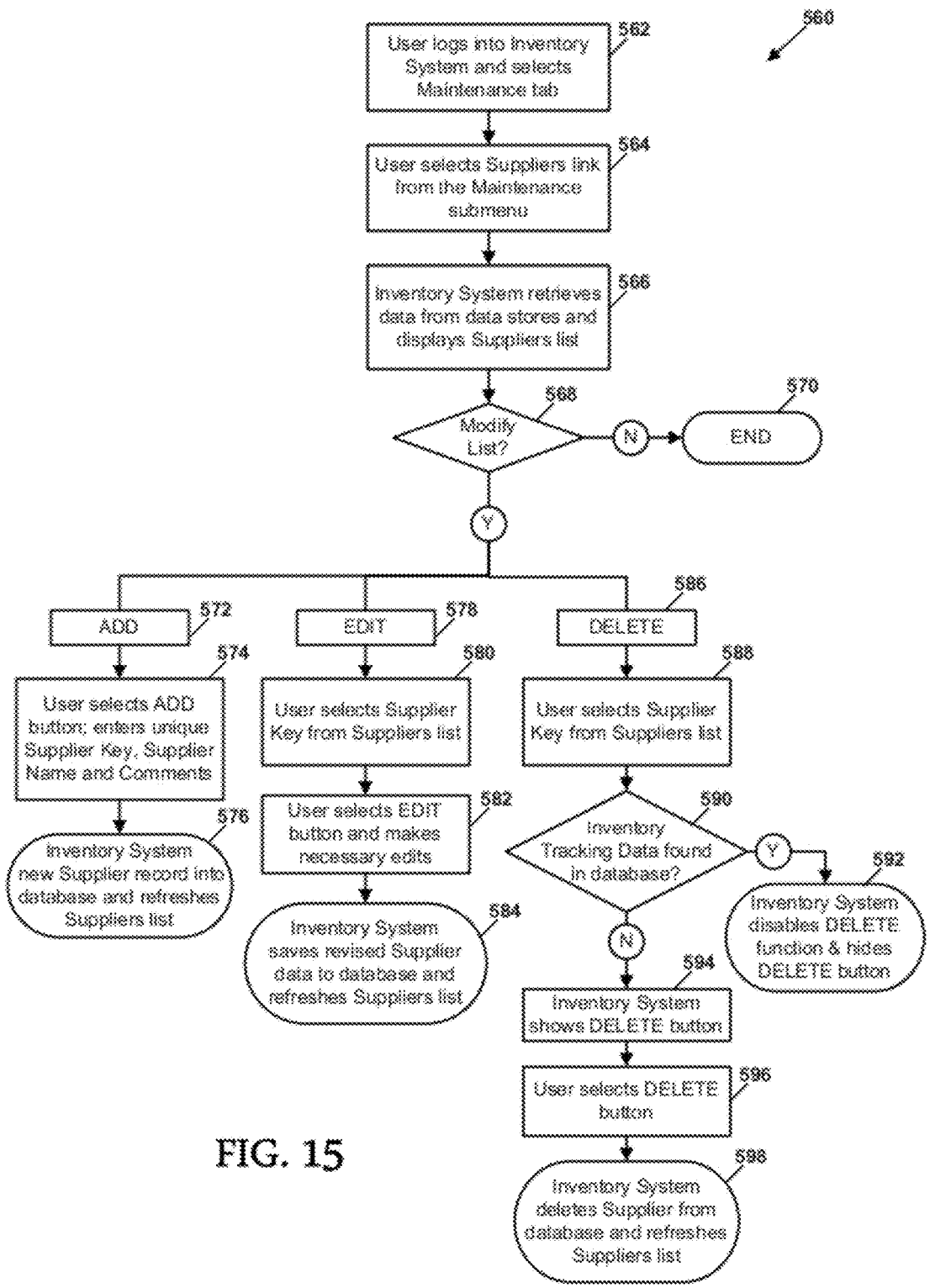
Figure 39:
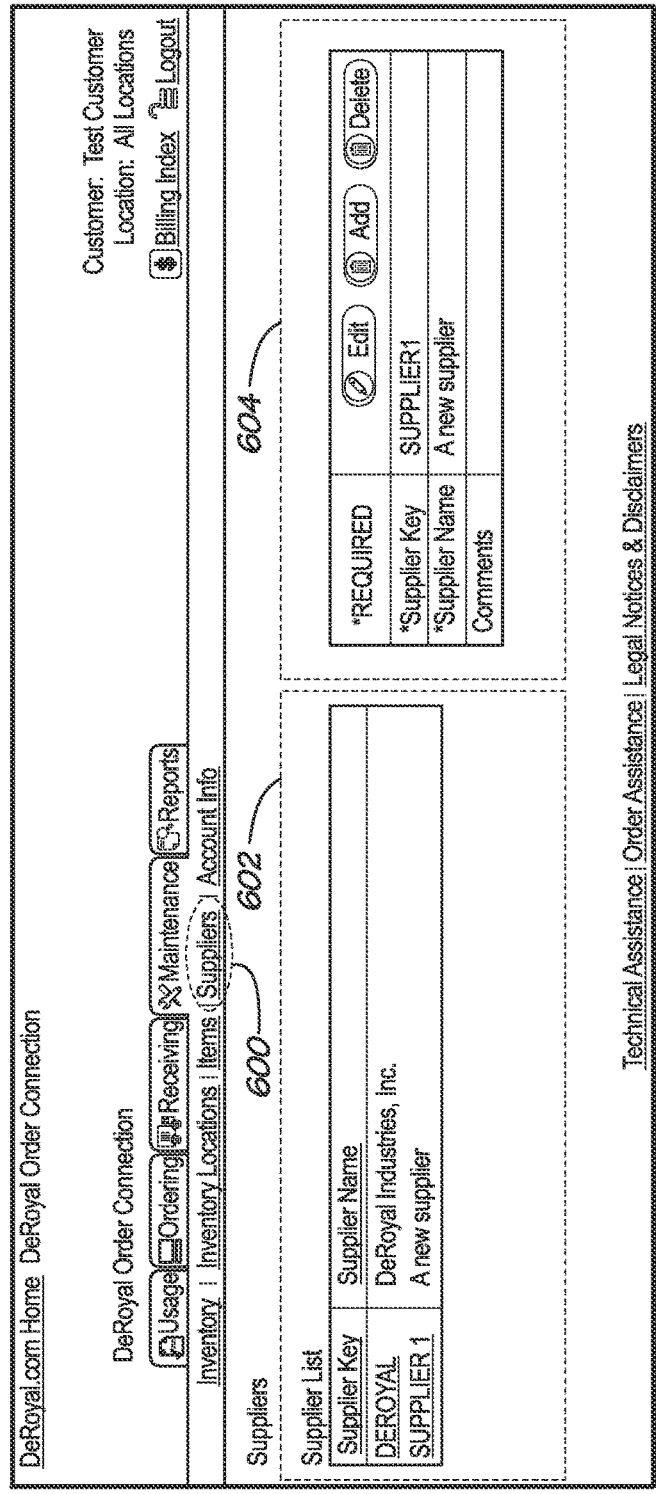

FIG. 15 depicts a process 560 for maintaining supplier information. To begin this process, a user logs into the inventory management application 28 running on the inventory management computer 26 via the Internet 16 and selects the Maintenance tab on the browser screen as depicted in FIG. 39 (step 562) and selects the Suppliers link 600 in the Maintenance submenu (step 564). The inventory management application 28 retrieves supplier data, and displays this information in a supplier list 602 on the screen (step 566). Using the options provided in the Supplier Details box 604, the user can add suppliers (steps 572-576), edit suppliers (steps 578-584), or delete suppliers (steps 586-598) as shown in FIG. 15.

Figure 16:
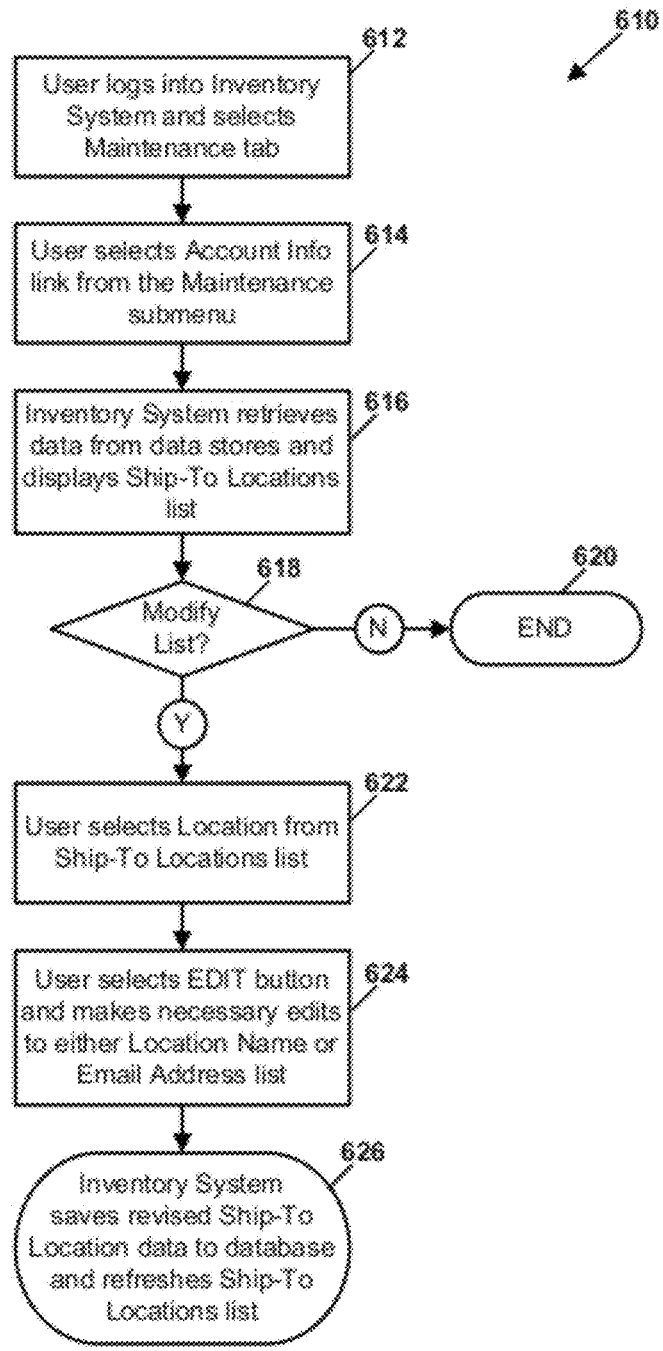

FIG. 16 depicts a process 610 for maintaining ship-to location information. To begin this process, a user logs into the inventory management application 28 running on the inventory management computer 26 via the Internet 16 and selects the Maintenance tab on the browser screen as depicted in FIG. 40 (step 612) and selects the Account Info link 628 in the Maintenance submenu (step 614). The inventory management application 28 retrieves ship-to location data, and displays this information in a Ship-To Locations list 630 on the screen (step 616). Using the Edit button 632, the user may then change the location name or the email address of the person who is to receive shipment confirmation information (steps 618-626) for the selected ship-to location.

Figure 17:
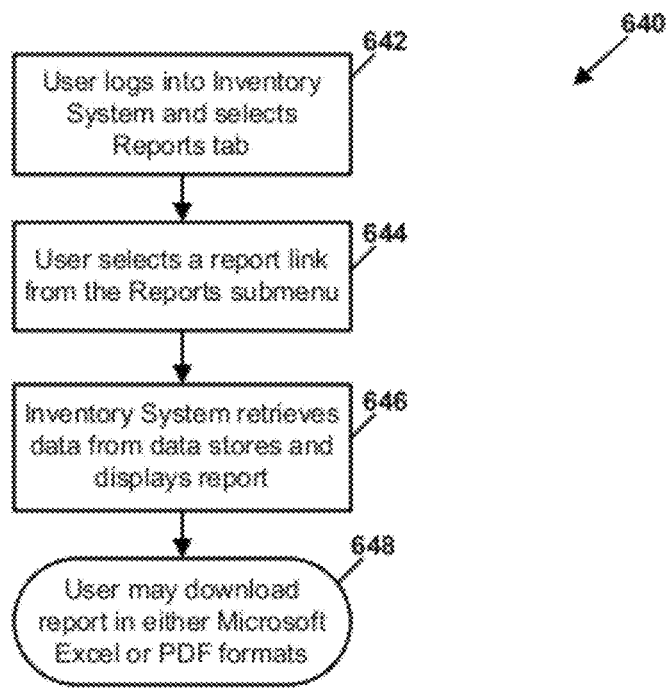

FIG. 17 depicts a process 640 for viewing and printing reports. To begin this process, a user logs into the inventory management application 28 running on the inventory management computer 26 via the Internet 16 and selects the Reports tab (step 642) and selects a report link in the Reports submenu (step 644). The inventory management application 28 retrieves the report data and displays the selected report (step 646) at which point the user may download the report in a desired format (step 648).

As discussed above, each tray of implants and other medical devices, such as the tray 660 depicted in FIG. 42, preferably bears a unique tray identification code 661 (barcode or QR code) printed on the surface of the tray. Alternatively, the unique tray identification code 661 may be encoded in an RFID chip embedded in the tray. Use of this code 661 enables physical tracking of the tray as it is used, replenished, and reused. For example, when a tray is initially built or rebuilt at a manufacturer/supplier facility, its identification code 661 may be scanned using the manufacturer sensor 15g (FIG. 1). When a complete tray is shipped from a manufacturer/supplier and received into an inventory supply room at a hospital or outpatient surgical center, its identification code 661 may be scanned using the inventory storage sensor 15a. Similarly, when a complete tray is received into inventory at a POD, its identification code 661 may be scanned using the POD sensor 15d. When the tray is taken to the operating room to be used in a surgical procedure, its identification code 661 may be scanned using the operating room sensor 15b. When the tray is decontaminated after completion of the procedure, its identification code 661 may be scanned using the decontamination sensor 15c. When the tray is restocked and wrapped, its identification code 661 may be scanned using the restocking sensor 15f. When the tray is sterilized after restocking, its identification code 661 may be scanned using the sterilization sensor 15e. When the tray is placed back into the inventory supply room, its identification code 661 may again be scanned using the inventory storage sensor 15a. At each location, the tray identification code 661 is preferably associated with a location code or other identifier that is unique to the sensor 15 at the location at which the code 661 is scanned. The identification code and location code from each location are communicated to the inventory management computer 26 via the communication network 16. The Tracking Module 28f of the inventory management application 28 then records the identification codes in association with the location codes in the implant inventory database 32.

Using this tracking information, the inventory management service provider may ascertain whether a customer is using one or two trays over and over again for a particular type of procedure while other trays for that procedure are sitting unused in inventory. This information would inform the service provider whether the customer may be maintaining more inventory than is really needed, and the service provider may use this information to better meet the needs of its customers. This tracking information would also inform the service provider whether any particular tray is currently at a hospital or outpatient surgery center, or in inventory at a POD.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An inventory data management system for managing information related to a set of medical items that is at least partially used during a medical procedure in a medical facility, the inventory data management system comprising:
a container customized for holding the set of medical items as the set of medical items is transported to a procedure room in the medical facility and for holding the set of medical items in the procedure room as one or more of the medical items are removed from the container for use during the medical procedure, the container having a unique container identification code disposed thereon, the container having a plurality of designated positions for holding a plurality of items in the set, each designated position having an optically-readable item identifier code disposed on the container adjacent to the designated position;
a plurality of sensing devices, including image-sensing devices, for reading the optically-readable item identifier codes and the container identification code from the container, the image-sensing devices provided in a plurality of locations in the medical facility and not on the container, each location associated with a particular status of the container, the image-sensing devices including at least one image-sensing device disposed in the medical facility for reading optically-readable item identifier codes disposed on the container adjacent designated positions in the container that are empty after completion of the medical procedure, the sensing devices in communication with a communication network;

an inventory management computer for executing an inventory management application to receive the container identification code in an electronic form from the communication network and associate the container identification code with container status information based on the location of the sensing device that read the container identification code, and detecting the designated positions in the container that are empty;

an electronic data interchange server implementing electronic commerce transactions for used items in the set of medical items, and an item inventory database in communication with the inventory management computer, the item inventory database for storing the container identification code in association with the container status information.

2. The system of claim 1 wherein the plurality of sensing devices include a sensing device disposed in an operating room location, and the inventory management computer receives the container identification code from the communication network, and associates the container identification code with container status information indicating that the container is located in the operating room location.

3. The system of claim 2 wherein:

the at least one sensing device includes a sensing device disposed in a restocking area in the medical facility for reading item identifier codes disposed on the container adjacent designated positions in the container that are empty after completion of the medical procedure and for reading the container identification code from the container;

the inventory management computer receives the container identification code from the communication network and associates the container identification code with set status information indicating that the set of items is located in the restocking area; and the inventory management computer receives the item identifier codes from the communication network and generates a list of medical items and a quantity of each item needed to replenish the empty designated positions in the container.

4. The system of claim 1 wherein the container identification code is encoded in one or more of a barcode, a Quick Response code, and an RFID device disposed on the container.

5. The system of claim 1 wherein the set of medical items comprises a set of surgical implants.

6. The system of claim 1 wherein the plurality of image-sensing devices comprise barcode readers, one or more Quick Response (QR) code readers, or one or more digital cameras.

7. The system of claim 1 wherein the optically-readable item identifier codes are encoded in one or more of a printed number, a barcode, and a Quick Response code disposed on the container.

* * * * *